US011935217B2

(12) United States Patent
Zhang et al.

(10) Patent No.: US 11,935,217 B2
(45) Date of Patent: Mar. 19, 2024

(54) GENERATING DEEP HARMONIZED DIGITAL IMAGES

(71) Applicant: Adobe Inc., San Jose, CA (US)

(72) Inventors: He Zhang, San Jose, CA (US); Yifan Jiang, Austin, TX (US); Yilin Wang, San Jose, CA (US); Jianming Zhang, Campbell, CA (US); Kalyan Sunkavalli, San Jose, CA (US); Sarah Kong, Cupertino, CA (US); Su Chen, San Jose, CA (US); Sohrab Amirghodsi, Seattle, WA (US); Zhe Lin, Fremont, CA (US)

(73) Assignee: Adobe Inc., San Jose, CA (US)

( * ) Notice: Subject to any disclaimer, the term of this patent is extended or adjusted under 35 U.S.C. 154(b) by 253 days.

(21) Appl. No.: 17/200,338

(22) Filed: Mar. 12, 2021

(65) Prior Publication Data

US 2022/0292654 A1     Sep. 15, 2022

(51) Int. Cl.
*G06T 7/00*     (2017.01)
*G06N 3/04*     (2023.01)
(Continued)

(52) U.S. Cl.
CPC .................. *G06T 5/50* (2013.01); *G06N 3/04* (2013.01); *G06N 3/08* (2013.01); *G06T 7/194* (2017.01);
(Continued)

(58) Field of Classification Search
CPC . G06T 7/194; G06T 11/60; G06T 5/50; G06T 7/11; G06T 11/00; G06T 3/00;
(Continued)

(56) References Cited

U.S. PATENT DOCUMENTS

2018/0260668 A1\*   9/2018   Shen ...................... G06V 10/82
2018/0357514 A1\*   12/2018   Zisimopoulos ...... G06V 10/764
(Continued)

OTHER PUBLICATIONS

Madimir Bychkovsky, Sylvain Paris, Eric Chan, and Fredo Durand. Learning photographic global tonal adjustment with a database of input/output image pairs. In CVPR 2011, pp. 97-104. IEEE, 2011.
(Continued)

*Primary Examiner* — Quan M Hua
(74) *Attorney, Agent, or Firm* — Keller Preece PLLC

(57) ABSTRACT

The present disclosure relates to systems, methods, and non-transitory computer readable media for accurately, efficiently, and flexibly generating harmonized digital images utilizing a self-supervised image harmonization neural network. In particular, the disclosed systems can implement, and learn parameters for, a self-supervised image harmonization neural network to extract content from one digital image (disentangled from its appearance) and appearance from another from another digital image (disentangled from its content). For example, the disclosed systems can utilize a dual data augmentation method to generate diverse triplets for parameter learning (including input digital images, reference digital images, and pseudo ground truth digital images), via cropping a digital image with perturbations using three-dimensional color lookup tables ("LUTs"). Additionally, the disclosed systems can utilize the self-supervised image harmonization neural network to generate harmonized digital images that depict content from one digital image having the appearance of another digital image.

20 Claims, 13 Drawing Sheets

(51) Int. Cl.
  *G06N 3/08* (2023.01)
  *G06T 5/50* (2006.01)
  *G06T 7/194* (2017.01)
  *G06T 11/00* (2006.01)
  *G06T 11/60* (2006.01)

(52) U.S. Cl.
  CPC ............ *G06T 11/001* (2013.01); *G06T 11/60* (2013.01); *G06T 2207/20081* (2013.01); *G06T 2207/20084* (2013.01); *G06T 2207/20092* (2013.01); *G06T 2207/20132* (2013.01); *G06T 2207/20212* (2013.01)

(58) Field of Classification Search
  CPC .. G06T 3/40; G06T 7/174; G06T 7/90; G06T 11/40; G06T 5/00; G06T 7/586; G06T 9/00; G06N 3/08; G06N 3/04; G06N 3/02; G06V 10/75; G06V 10/80; G06V 10/40; G06V 10/44; G06V 10/774; G06V 10/08
  See application file for complete search history.

(56) References Cited

U.S. PATENT DOCUMENTS

| | | | |
|---|---|---|---|
| 2019/0213772 A1* | 7/2019 | Lombardi | G06T 15/04 |
| 2020/0134834 A1* | 4/2020 | Pao | G06T 7/11 |
| 2020/0184660 A1* | 6/2020 | Shi | G06T 7/30 |
| 2021/0067848 A1* | 3/2021 | Kanazawa | G08C 19/00 |

OTHER PUBLICATIONS

Jianrui Cai, Hui Zeng, Hongwei Yong, Zisheng Cao, and Lei Zhang. Toward real-world single image super-resolution: A new benchmark and a new model. In Proceedings of the IEEE International Conference on Computer Vision, pp. 3086-3095, 2019.

Ting Chen, Simon Kornblith, Mohammad Norouzi, and Geoffrey Hinton. A simple framework for contrastive learning of visual representations. arXiv preprint arXiv:2002.05709, 2020.

Daniel Cohen-Or, Olga Sorkine, Ran Gal, Tommer Leyvand, and Ying-Qing Xu. Color harmonization. In ACM SIG-GRAPH 2006 Papers, pp. 624-630. 2006.

Wenyan Cong, Jianfu Zhang, Li Niu, Liu Liu, Zhixin Ling, Weiyuan Li, and Liqing Zhang. Dovenet: Deep image harmonization via domain verification. In Proceedings of the IEEE/CVF Conference on Computer Vision and Pattern Recognition, pp. 8394-8403, 2020.

Xiaodong Cun and Chi-Man Pun. Improving the harmony of the composite image by spatial-separated attention module. IEEE Transactions on Image Processing, 29:4759-4771, 2020.

Chao Dong, Chen Change Loy, Kaiming He, and Xiaoou Tang. Image super-resolution using deep convolutional networks. IEEE transactions on pattern analysis and machine intelligence, 38(2):295-307, 2015.

Ulrich Fecker, Marcus Barkowsky, and Andre Kaup. Histogram-based prefiltering for luminance and chrominance compensation of multiview video. IEEE Transactions on Circuits and Systems for Video Technology, 18(9):1258-1267, 2008.

Spyros Gidaris, Praveer Singh, and Nikos Komodakis. Unsupervised representation learning by predicting image rotations. arXiv preprint arXiv:1803.07728, 2018.

Kaiming He, Haoqi Fan, Yuxin Wu, Saining Xie, and Ross Girshick. Momentum contrast for unsupervised visual representation learning. In Proceedings of the IEEE/CVF Conference on Computer Vision and Pattern Recognition, pp. 9729-9738, 2020.

Jiaya Jia, Jian Sun, Chi-Keung Tang, and Heung-Yeung Shum. Drag-and-drop pasting. ACM Transactions on graphics (TOG), 25(3):631-637, 2006.

Samuli Laine, Tero Karras, Jaakko Lehtinen, and Timo Aila. High-quality self-supervised deep image denoising. In Advances in Neural Information Processing Systems, pp. 6970-6980, 2019.

Jean-Francois Lalonde and Alexei A Efros. Using color compatibility for assessing image realism. In 2007 IEEE 11th International Conference on Computer Vision, pp. 1-8. IEEE, 2007.

Joon-Young Lee, Kalyan Sunkavalli, Zhe Lin, Xiaohui Shen, and In So Kweon. Automatic content-aware color and tone stylization. In Proceedings of the IEEE conference on computer vision and pattern recognition, pp. 2470-2478, 2016.

Tsung-Yi Lin, Michael Maire, Serge Belongie, James Hays, Pietro Perona, Deva Ramanan, Piotr Dollar, and C Lawrence Zitnick. Microsoft coco: Common objects in context. In European conference on computer vision, pp. 740-755. Springer, 2014.

Laurens van der Maaten and Geoffrey Hinton. Visualizing data using t-sne.Journal of machine learning research, 9(Nov.): 2579-2605, 2008.

Seungjun Nah, Tae Hyun Kim, and Kyoung Mu Lee. Deep multi-scale convolutional neural network for dynamic scene deblurring. InProceedings of the IEEE Conference on Computer Vision and Pattern Recognition, pp. 3883-3891, 2017.

Mehdi Noroozi and Paolo Favaro. Unsupervised learning of visual representations by solving jigsaw puzzles. In European Conference on Computer Vision, pp. 69-84. Springer, 2016.

Adam Paszke, Sam Gross, Francisco Massa, Adam Lerer, James Bradbury, Gregory Chanan, Trevor Killeen, Zeming Lin, Natalia Gimelshein, Luca Antiga, et al. Pytorch: An imperative style, high-performance deep learning library. In Advances in neural information processing systems, pp. 8026-8037, 2019.

Patrick Perez, Michel Gangnet, and Andrew Blake. Poisson image editing. InACM SIGGRAPH 2003 Papers, pp. 313-318. 2003.

Francois Pitie, Anil C Kokaram, and Rozenn Dahyot. N-dimensional probability density function transfer and its application to color transfer. InTenth IEEE International Conference on Computer Vision (ICCV'05) vol. 1, vol. 2, pp. 1434-1439. IEEE, 2005.

Francois Pitie, Anil C Kokaram, and Rozenn Dahyot. Automated colour grading using colour distribution transfer. Computer Vision and Image Understanding, 107(1-2):123-137, 2007.

Erik Reinhard, Michael Adhikhmin, Bruce Gooch, and Peter Shirley. Color transfer between images. IEEE Computer graphics and applications, 21(5):34-41, 2001.

Jaesung Rim et al. Real-World Blur Dataset for Learning and Benchmarking Deblurring Algorithms. PhD thesis, DGIST, 2020. Part 1.

Jaesung Rim et al. Real-World Blur Dataset for Learning and Benchmarking Deblurring Algorithms. PhD thesis, DGIST, 2020. Part 2.

Kalyan Sunkavalli, Micah K Johnson, Wojciech Matusik, and Hanspeter Pfister. Multi-scale image harmonization. ACM Transactions on Graphics (TOG), 29(4):1-10, 2010. Part 1.

Kalyan Sunkavalli, Micah K Johnson, Wojciech Matusik, and Hanspeter Pfister. Multi-scale image harmonization. ACM Transactions on Graphics (TOG), 29(4):1-10, 2010. Part 2.

Michael W Tao, Micah K Johnson, and Sylvain Paris. Error-tolerant image compositing. In European Conference on Computer Vision, pp. 31-44. Springer, 2010.

Yi-Hsuan Tsai, Xiaohui Shen, Zhe Lin, Kalyan Sunkavalli, Xin Lu, and Ming-Hsuan Yang. Deep image harmonization.In Proceedings of the IEEE Conference on Computer Vision and Pattern Recognition, pp. 3789-3797, 2017.

Zhou Wang, Alan C Bovik, Hamid R Sheikh, and Eero P Simoncelli. Image quality assessment: from error visibility to structural similarity. IEEE transactions on image processing, 13(4):600-612, 2004.

Xuezhong Xiao and Lizhuang Ma. Color transfer in correlated color space. In Proceedings of the 2006 ACM international conference on Virtual reality continuum and its applications, pp. 305-309, 2006.

Su Xue, Aseem Agarwala, Julie Dorsey, and Holly Rushmeier. Understanding and improving the realism of image composites. ACM Transactions on graphics (TOG), 31(4):1-10, 2012.

Richard Zhang, Phillip Isola, Alexei A Efros, Eli Shechtman, and Oliver Wang. The unreasonable effectiveness of deep features as a perceptual metric. In Proceedings of the IEEE conference on computer vision and pattern recognition, pp. 586-595, 2018.

Hao Zhou, Torsten Sattler, and David W Jacobs. Evaluating local features for day-night matching. In European Conference on Computer Vision, pp. 724-736. Springer, 2016.

(56) References Cited

OTHER PUBLICATIONS

Jun-Yan Zhu, Philipp Krahenbuhl, Eli Shechtman, and Alexei A Efros. Learning a discriminative model for the perception of realism in composite images. In Proceedings of the IEEE International Conference on Computer Vision, pp. 3943-3951, 2015.

* cited by examiner

| Methods | PSNR ↑ | MSE ↓ | SSIM ↑ | LPIPS ↓ |
|---|---|---|---|---|
| DC | 25.91 | 409.54 | 0.9385 | 0.049 |
| Lee et al. | 23.85 | 389.65 | 0.9049 | 0.068 |
| DIH | 23.96 | 433.52 | 0.8661 | 0.082 |
| S²AM | 26.77 | 283.27 | 0.9366 | 0.053 |
| DoveNet | 27.41 | 214.11 | 0.9416 | 0.044 |
| Image Harmonization System | 27.91 | 206.85 | 0.9479 | 0.039 |

*Fig. 9*

GENERATING DEEP HARMONIZED DIGITAL IMAGES

BACKGROUND

Image harmonization is a step in image compositing that aims to adjust the appearance of a foreground object to better match a background for a more realistic and seamless result. Recent years have seen significant developments in software and hardware platforms for compositing digital images by blending features of multiple input images together (e.g., a background from one image and a foreground from another image). Nonetheless, many conventional digital image editing systems require users to individually adjust brightness, color/saturation, contrast, and positioning in an iterative process that often leads to unsatisfactory results for all but expert users. Despite the advancements in approaches for compositing digital images, conventional digital image editing systems continue to experience a number of impediments or disadvantages, particularly with regard to accuracy, efficiency, and flexibility.

SUMMARY

One or more embodiments described herein provide benefits and solve one or more of the foregoing or other problems in the art with systems, methods, and non-transitory computer readable media that generate harmonized digital images utilizing a self-supervised image harmonization neural network. Using the techniques and methods described herein, the disclosed systems improve the quality of image compositing by automatically matching color tone, brightness, and contrast between digital images (e.g., between foreground digital images and background digital images). Specifically, the disclosed systems implement, and learn parameters for, a self-supervised image harmonization neural network to extract content from one digital image (disentangled from its appearance) and appearance from another from another digital image (disentangled from its content). The design of the self-supervised image harmonization neural network allows for utilizing a dual data augmentation method to generate diverse triplets (including input digital images, reference digital images, and pseudo ground truth digital images) via cropping a digital image with perturbations using three-dimensional color lookup tables ("LUTs"). Thus, the design of the self-supervised image harmonization neural network allows for learning of parameters without collecting or use of large-scale training datasets. By utilizing the self-supervised image harmonization neural network, the disclosed systems can accurately, efficiently, and flexibly generate harmonized digital images.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure describes one or more embodiments of the invention with additional specificity and detail by referencing the accompanying figures. The following paragraphs briefly describe those figures, in which:

FIG. 9 illustrates a table of performance metrics comparing the image harmonization system with conventional systems in accordance with one or more embodiments;

DETAILED DESCRIPTION

Figure 1:
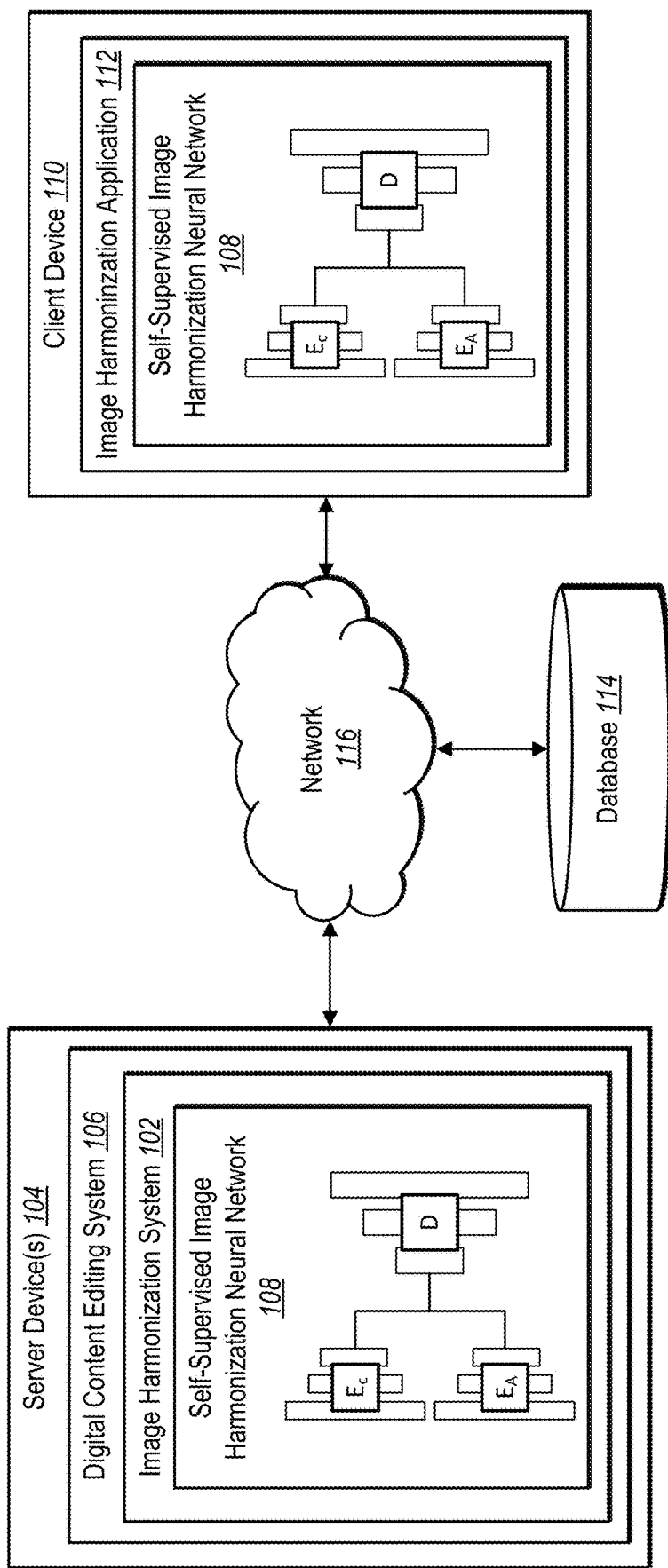
FIG. 1 illustrates an example system environment in which an image harmonization system operates in accordance with one or more embodiments.

One or more embodiments described herein include an image harmonization system that accurately, efficiently, and flexibly generates harmonized digital images utilizing a self-supervised image harmonization neural network. For instance, the image harmonization system extracts a content from an input digital image and further extracts an appearance from a reference digital image utilizing a self-supervised image harmonization neural network (that includes a neural network content encoder and a neural network appearance encoder). In one or more embodiments, the image harmonization system also combines the content and the appearance to generate a modified digital image that depicts the content of the input digital image with the appearance of the reference digital image. From the modified digital image, in some cases, the image harmonization system further generates a harmonized digital image by combining a portion of the modified digital image (e.g., indicated by a mask) with the reference digital image.

As just mentioned, in one or more embodiments the image harmonization system utilizes a self-supervised image harmonization neural network. For example, the image harmonization system utilizes the self-supervised image harmonization neural network to generate a harmonized digital image by modifying content of one image to match or resemble the appearance of another image. In some embodiments, the image harmonization system utilizes a self-supervised image harmonization neural network that includes one or more constituent neural networks such as a neural network content encoder, a neural network appearance encoder, and a neural network decoder.

For instance, the image harmonization system utilizes a neural network content encoder to extract a content code from an input digital image, disentangled from an appearance of the input digital image. Specifically, the image harmonization system utilizes the neural network content encoder to extract features that resemble or reflect a geometric layout of the input digital image, where the features are disentangled from other features that reflect image appearance. In some cases, the content code includes latent features that represent the positioning and shapes of different objects within the input digital image.

In one or more embodiments, the image harmonization system also utilizes the neural network appearance encoder to extract an appearance code from a reference digital image (e.g., different from the input digital image used for extracting content). For example, the image harmonization system utilizes the neural network appearance encoder to extract features that represent or reflect the appearance of the reference digital image, where the appearance features are disentangled from other features that represent the content of the image. In certain implementations, the appearance code includes latent features that represent appearance characteristics such as color, contrast, brightness, and/or saturation (and that exclude texture).

As mentioned above, in one or more embodiments, the image harmonization system utilizes the self-supervised image harmonization neural network to combine the content code and the appearance code to generate a modified digital image. More specifically, the image harmonization system generates a modified digital image utilizing a neural network decoder to combine the content code extracted from the input digital image with the appearance code extracted from the reference digital image. Thus, in some cases, the image harmonization system generates a modified digital image that depicts content from the input digital image having an appearance matching that of the reference digital image.

From the modified digital image, in some embodiments, the image harmonization system further generates a harmonized digital image. To elaborate, the image harmonization system combines the modified digital image with the reference digital image to generate a harmonized digital image that depicts, for example, a foreground made up of a portion of the modified digital image overlaid on a background composed of the reference digital image (so that the appearance of the foreground and the background match). In these or other embodiments, the image harmonization system also utilizes a mask to identify the portion of the modified digital image to combine with the reference digital image.

In some cases, the self-supervised image harmonization neural network operates in low resolutions for speed and efficiency. In these cases, the modified digital image learns a fitting function from low resolutions and applies the function at high resolutions to combine the modified digital image (or the portion of the modified digital image) with the reference digital image to generate a high-resolution harmonized digital image.

In some embodiments, the image harmonization system implements a self-supervised image harmonization neural network with parameters learned from unlabeled, natural digital images (as opposed to human-curated training images). For example, the image harmonization system learns utilizes a dual data augmentation technique to augment appearance and content of digital images to generate learning triplets. The image harmonization system utilizes the learning triplets to learn parameters for the self-supervised image harmonization neural network (e.g., including the neural network appearance encoder, the neural network content encoder, and the neural network decoder).

As mentioned, in some embodiments, the image harmonization system learns parameters for the self-supervised image harmonization neural network. For example, the image harmonization system utilizes a dual data augmentation method to augment or modify digital images for inputting into the self-supervised image harmonization neural network during a training or tuning process. In some cases, the image harmonization system dually augments digital images by initially cropping the digital images and subsequently augmenting appearances of the crops, or by initially augmenting the appearance of a digital image and subsequently cropping the appearance-augmented digital image (s). The image harmonization system utilizes the training process to learn parameters of the neural network appearance encoder, the neural network content encoder, and the neural network decoder.

As part of the dual data augmentation, in some implementations, the image harmonization system augments content of an initial digital image (or of an appearance-augmented digital image in cases where appearance is augmented before content). For example, the image harmonization system augments content by utilizing a multi-cropping technique to generate different digital image crops from the digital image (or from an appearance-augmented digital image). The cropping ranges from a local region to a global region to mimic diverse environments and reduce the gap between synthetic testing data and real testing data.

As a further part of the dual data augmentation, in some embodiments, the image harmonization system augments an appearance of the digital image crops (or of the initial digital image in cases where appearance is augmented before content). For example, the image harmonization system augments one or more appearance characteristics such as color, contrast, brightness, and/or saturation (without augmenting texture). In some cases, the image harmonization system utilizes a three-dimensional color lookup table ("LUT") to modify color of the digital image crops (or the initial digital image).

In addition to dually augmenting digital images as part of the parameter learning process, in certain embodiments, the image harmonization system selects or identifies pairs of digital image crops (e.g., augmented by appearance and/or content) to use for training the self-supervised image harmonization neural network. In some cases, a pair of digital image crops includes a content crop (e.g., a digital image crop with a first appearance) and an appearance crop (e.g., a digital image crop with a second, different appearance).

In one or more implementations, the image harmonization system inputs a pair of digital image crops into the self-supervised image harmonization neural network. More specifically, the image harmonization system inputs a content crop into a neural network content encoder and inputs an appearance crop into a neural network appearance encoder. In turn, the neural network content encoder and the neural network appearance encoder generate a content code and an appearance code, respectively. In some cases, image harmonization system further generates a modified digital image (or a modified digital image crop) by combining the content code and the appearance code utilizing a neural network decoder.

Additionally, in some embodiments, the image harmonization system generates a pseudo ground truth crop to compare with the modified digital image (e.g., to test the accuracy of the self-supervised image harmonization neural network). For instance, the image harmonization system generates a pseudo ground truth crop from the same initial digital image, where the pseudo ground truth crop depicts a content of the content crop and an appearance of the appearance crop.

Further, in certain embodiments, the image harmonization system compares the pseudo ground truth crop with the modified digital image. For instance, the image harmonization system utilizes one or more loss functions, such as a harmonization loss function and/or a reconstruction loss function to determine a measure of error associated with the self-supervised image harmonization neural network. To reduce the measure of error, in some implementations, the image harmonization system modifies parameters of the neural network content encoder, the neural network appearance encoder, and/or the neural network decoder.

In some embodiments, the image harmonization system repeats the learning process for multiple iterations. More specifically, the image harmonization system repeats the process of i) dually augmenting a digital image (e.g., a new digital image for each iteration) to modify both content and appearance, ii) extracting content codes and appearance codes from pairs of digital image crops, iii) generating modified digital images by combining extracted content codes and appearance codes, iv) comparing the modified digital images with pseudo ground truth crops, and v) modifying the parameters of the self-supervised image harmonization neural network based on the comparison.

As mentioned, conventional digital image editing systems exhibit a number of drawbacks, particularly in accuracy, efficiency, and flexibility. To illustrate, many conventional image editing systems inaccurately composite digital images that are not well harmonized (e.g., where foregrounds and backgrounds don't have matching or similar appearances). Additionally, in many instances, conventional systems suffer from background occlusion issues. Specifically, due to the requirements of perturbing an input image to create training data, existing systems cannot make effective use of background context for harmonization. For example, when a foreground object from one image occupies a large area of a combined image, many conventional systems fail to capture the appearance of the background, and therefore, generate visually jarring results where the appearance of the foreground object is not well matched to the background image.

In addition, many conventional digital image editing systems are also inefficient. In particular, conventional systems often have to collect large quantities of high quality data to train neural networks for image compositing tasks, which is computationally expensive and time-consuming. Indeed, many existing systems require generating unharmonized composite images and training a neural network to regress to the original input image. Generating composite images as training data requires large amounts of computing resources such as processing time, processing power, and memory.

Further, conventional digital image editing systems are often inflexible. For instance, some conventional systems are rigidly fixed to limited harmonization variability and cannot adapt to real-world compositing scenarios. Indeed, existing systems often consider only simple, low-dimensional color transfer functions to generate training and/or testing images. As a result of these limitations, conventional systems often cannot generalize for compositing digital images with more complex appearance discrepancies.

As suggested above, embodiments of the image harmonization system can provide several advantages over conventional digital image editing systems. For example, embodiments of the image harmonization system can provide improved accuracy over conventional systems. While many conventional systems inaccurately composite digital images, embodiments of the image harmonization system generate harmonized digital images with accurate appearance matching and without background occlusion problems. Indeed, by individually extracting content codes and appearance codes utilizing the self-supervised image harmonization neural network, the image harmonization system circumvents the background occlusion problem exhibited by some existing systems by leveraging the entire reference image (rather than only non-occluded portions). As a result, the image harmonization system generates more accurate, higher-quality harmonized digital images with visually appealing, realistic appearance matching between combined portions from different images.

The image harmonization system can also improve computational efficiency over many conventional digital image editing systems. Indeed, by implementing a dual data augmentation method, the image harmonization system avoids the expensive task of generating composite training images and does not require high-quality labeled training images (unlike existing systems). Instead, the image harmonization system generates data to learn content and appearance information—a far easier task. As a consequence, the image harmonization system consumes fewer computing resources such as processing time, processing power, and memory as compared to many conventional systems.

Moreover, embodiments of the image harmonization system further improve flexibility over conventional digital image editing systems. In contrast to existing systems that experience limited harmonization variability due to their use of low-dimensional color transfer functions, the image harmonization system flexibly generates harmonized digital images with a wide range of variability. For instance, embodiments of the image harmonization system utilize the disclosed self-supervised image harmonization neural network (with parameters learned from dually augmented training data) together with a fitting function to generate harmonized digital image in high resolutions across a broad spectrum of appearances. Indeed, unlike conventional systems, the image harmonization system can flexibly adapt to complex real-world compositing scenarios with stark discrepancies in appearance between combined images.

Additional detail regarding the image harmonization system will now be provided with reference to the figures. For example, FIG. 1 illustrates a schematic diagram of an example system environment for implementing an image harmonization system 102 in accordance with one or more embodiments. An overview of the image harmonization system 102 is described in relation to FIG. 1. Thereafter, a more detailed description of the components and processes of the image harmonization system 102 is provided in relation to the subsequent figures.

As shown, the environment includes server device(s) 104, a client device 110, a database 114, and a network 116. Each of the components of the environment communicate via the network 116, and the network 116 is any suitable network over which computing devices communicate. Example networks are discussed in more detail below in relation to FIG. 13.

As mentioned, the environment includes a client device 110. The client device 110 is one of a variety of computing devices, including a smartphone, a tablet, a smart television, a desktop computer, a laptop computer, a virtual reality device, an augmented reality device, or another computing device as described in relation to FIG. 13. Although FIG. 1 illustrates a single client device 110, in some embodiments the environment includes multiple different client devices, each associated with a different user (e.g., a digital image editor). The client device 110 communicates with the server device(s) 104 via the network 116. For example, the client device 110 receives user input from a user interacting with the client device to, for instance, generate a harmonized digital image by combining an object or portion from one image onto another image. In some cases, the client device 110 receives user input to indicate a mask defining a portion from an input digital image to combine with a reference digital image. Thus, the image harmonization system 102 on the server device(s) 104 receives information or instructions to generate a harmonized digital image from two or more digital images stored within the database 114.

As shown, the client device 110 includes an image harmonization application 112. In particular, the image harmonization application 112 is a web application, a native application installed on the client device 110 (e.g., a mobile application, a desktop application, etc.), or a cloud-based application where all or part of the functionality is performed by the server device(s) 104. The image harmonization application 112 presents or displays information to a user, including a digital image editing interface. In some cases, a user interacts with the image harmonization application 112 to provide user input to perform operations as mentioned above, such as generating a harmonized digital image by modifying content from one image to match the appearance of another image.

As illustrated in FIG. 1, the environment includes the server device(s) 104. The server device(s) 104 generates, tracks, stores, processes, receives, and transmits electronic data, such as digital images and a self-supervised image harmonization neural network 108. For example, the server device(s) 104 receives data from the client device 110 in the form of an indication of user interaction selecting a digital image editing operation (e.g., to generate a harmonized digital image). In addition, the server device(s) 104 transmits data to the client device 110 to provide a harmonized digital image including a portion from an input digital image overlaid against, and with an appearance that matches, a reference digital image. Indeed, the server device(s) 104 communicates with the client device 110 to transmit and/or receive data via the network 116. In some embodiments, the server device(s) 104 comprises a distributed server where the server device(s) 104 includes a number of server devices distributed across the network 116 and located in different physical locations. The server device(s) 104 comprises a digital image server, a content server, an application server, a communication server, a web-hosting server, a multidimensional server, or a machine learning server.

As shown in FIG. 1, the server device(s) 104 also includes the image harmonization system 102 as part of a digital content editing system 106. The digital content editing system 106 communicates with the client device 110 to perform various functions associated with the image harmonization application 112 such as storing and managing a repository of digital images, generating harmonized digital images, and providing harmonized digital images for display. For example, the image harmonization system 102 communicates with the database 114 to access digital images and a self-supervised image harmonization neural network 108 used to modify the digital images. Indeed, as further shown in FIG. 1, the environment includes a database 114. In particular, the database 114 stores information such as digital images and the self-supervised image harmonization neural network 108.

In some implementations, the image harmonization system 102 supports the image harmonization application 112 on the client device 110. For instance, the image harmonization system 102 learns parameters for the self-supervised image harmonization neural network 108. The digital content editing system 106 then provides the self-supervised image harmonization neural network 108 to the client device 110. In other words, the client device 110 (e.g., the image harmonization application 112) obtains (e.g., downloads) the self-supervised image harmonization neural network 108 with the learned parameters from the server device(s) 104. Once downloaded, the image harmonization application 112 on the client device 110 can utilize the self-supervised image harmonization neural network 108 to generate harmonized digital image independent from the server device(s) 104 and the image harmonization system 102.

In alternative implementations, the image harmonization application 112 includes a web hosting application that allows the client device 110 to interact with content and services hosted on the server device(s) 104. To illustrate, in one or more implementations, the client device 110 accesses a web page via the supported by the server device(s) 104. For example, the client device 110 provides a foreground image and a background image to the server device(s) 104, and, in response, the image harmonization system 102 on the server device(s) 104 generates a harmonized image that combines a foreground from the foreground image that is harmonized to the background image with the background image. The server device(s) 104 then provides the harmonized image to the client device 110 for display.

Although FIG. 1 illustrates a particular arrangement of the environment, in some embodiments, the environment has a different arrangement of components and/or may have a different number or set of components altogether. For instance, in some embodiments, the image harmonization system 102 is implemented by (e.g., located entirely or in part on) the client device 110 and/or a third-party device. In addition, in one or more embodiments, the client device 110 communicates directly with the image harmonization system 102, bypassing the network 116. Further, in some embodiments, the database 114 is located external to the server device(s) 104 (e.g., in communication via the network 116) or located on the server device(s) 104 and/or on the client device 110.

Figure 2:
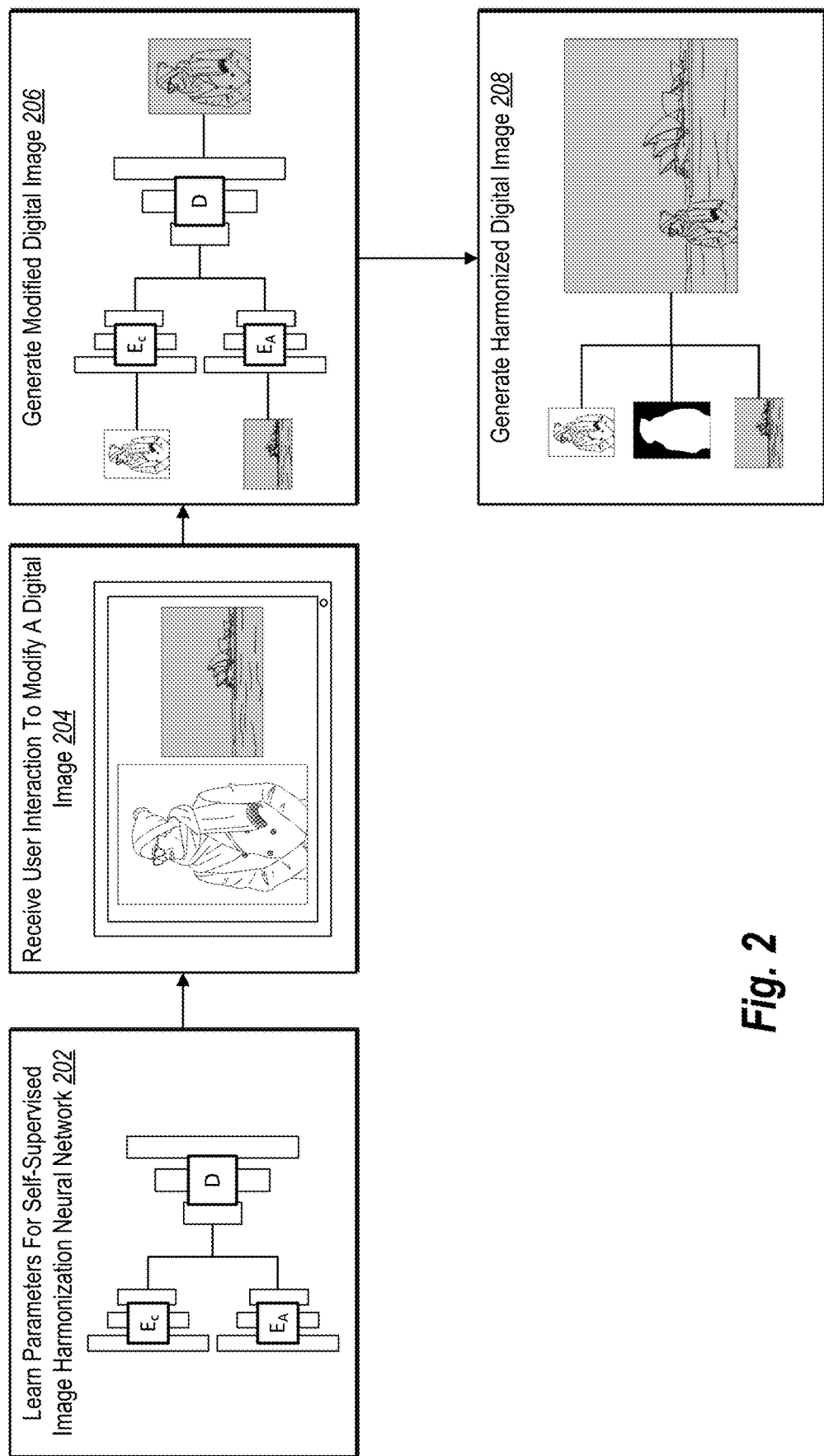
FIG. 2 illustrates an overview of generating a harmonized digital image utilizing a self-supervised image harmonization neural network in accordance with one or more embodiments.

As mentioned, in one or more embodiments, the image harmonization system 102 generates a harmonized digital image from an input digital image and a reference digital image. In particular, the image harmonization system 102 generates a harmonized digital image that includes at least a portion of an input digital image modified to combine with, and match an appearance of, a reference digital image. FIG. 2 illustrates an overview of a process for utilizing, and learning parameters for, a self-supervised image harmonization neural network 108 for generating a harmonized digital image in accordance with one or more embodiments. FIG. 2 provides a high-level description of the acts involved learning parameters for a self-supervised image harmonization neural network 108 and utilizing a self-supervised image harmonization neural network 108 to generate a harmonized digital image and. Additional detail regarding the specific acts is provided below with reference to subsequent figures.

As illustrated in FIG. 2, the image harmonization system 102 performs an act 202 to learn parameters for a self-supervised image harmonization neural network 108. More specifically, the image harmonization system 102 learns parameters for one or more neural networks that make up the self-supervised image harmonization neural network 108, such as a neural network content encoder, a neural network appearance encoder, and a neural network decoder.

A neural network can include a machine learning model that can be trained and/or tuned based on inputs to determine classifications or approximate unknown functions. For example, a neural network includes a model of interconnected artificial neurons (e.g., organized in layers) that communicate and learn to approximate complex functions and generate outputs (e.g., determinations of digital image classes or labels) based on a plurality of inputs provided to the neural network. In some cases, a neural network refers to an algorithm (or set of algorithms) that implements deep learning techniques to model high-level abstractions in data.

As described, a self-supervised image harmonization neural network 108 generates harmonized digital images by extracting and combining content codes and appearance codes. For example, a self-supervised image harmonization neural network 108 includes one or more other neural network that make up the self-supervised image harmonization neural network 108, such as a neural network content encoder, a neural network appearance encoder, and a neural network decoder. A neural network appearance encoder can include a neural network that extracts a content code (e.g., one or more latent feature representing content) from a digital image, disentangled from the image's appearance. A neural network content encoder can include a neural network that extracts an appearance code (e.g., one or more latent features representing appearance) from a digital image, disentangled from the image's content. A neural network decoder can include a neural network that combines a content code and an appearance code to generate or reconstruct a modified digital image depicting content corresponding to the content code having an appearance corresponding to the appearance code.

Indeed, the image harmonization system 102 utilizes a dual-encoder-based harmonization scheme to extract content and appearance (disentangled one from the other) from digital images. In some cases, digital image content (or simply "content") refers to a geometric layout or spatial arrangement of the digital image. For example, content indicates placement, sizes, and shapes of various objects depicted within a digital image. In the same or other embodiments, digital image appearance (or simply "appearance") refers to a visual aesthetic or visual style of a digital image. For example, appearance sometimes refers to one or more visual characteristics of a digital image, such as color, contrast, brightness, and saturation. In certain cases, appearance (and appearance characteristics) does not include a digital image's texture (e.g., spatial arrangement of colors or intensities).

To learn parameters, the image harmonization system 102 generates training data in the form of digital image crops to input into the neural network content encoder (represented by $E_C$) and the neural network appearance encoder (represented by $E_A$). For instance, the image harmonization system 102 utilizes a dual data augmentation method to augment or modify one or more of content or appearance of an initial digital image. Through dual data augmentation, the image harmonization system 102 generates a plurality of digital image crops (e.g., cropped portions of the initial digital image) and selects pairs of the digital image crops to input into the self-supervised image harmonization neural network 108.

In some case, the image harmonization system 102 modifies content before modifying appearance as part of dual data augmentation, while in other embodiments the image harmonization system 102 modifies appearance before modifying content (or modifies content and appearance simultaneously or concurrently). In cases where the image harmonization system 102 modifies content first, the image harmonization system 102 crops the initial digital image (e.g., into N crops for N training iterations) and subsequently augments the appearance of the individual digital image crops (e.g., by modifying color and/or other appearance characteristics) to generate dually augmented digital image crops. Conversely, in cases where the image harmonization system 102 modifies appearance first, the image harmonization system 102 augments color and/or other appearance characteristics of the initial digital image to generate an appearance-augmented digital image. In these cases, the image harmonization system 102 subsequently crops the appearance-augmented digital image to generate a plurality of dually augmented digital image crops.

As mentioned, the image harmonization system 102 selects pairs of digital image crops to input into the self-supervised image harmonization neural network 108 for parameter learning. Within a pair of digital image crops, the image harmonization system 102 selects a content crop and an appearance crop. A content crop can include a cropped portion of an initial digital image (e.g., with or without a modified appearance) for input into a neural network content encoder, while an appearance crop can include a cropped portion of the initial digital image that also has a modified appearance and that is for input into a neural network appearance encoder.

In any event, the image harmonization system 102 inputs the content crop into a neural network content encoder to extract a content code. In addition, the image harmonization system 102 inputs the appearance crop into a neural network appearance encoder to extract an appearance code. As shown, the image harmonization system 102 further utilizes a neural network decoder (represented by D) to combine the appearance code and the content code and thereby generate a modified digital image.

The image harmonization system 102 further utilizes one or more loss functions, such as a harmonization loss function and/or a reconstruction loss function, to compare the modified digital image with a pseudo ground truth crop. Additionally, the image harmonization system 102 modifies the parameters of the neural network appearance encoder, the neural network content encoder, and/or the neural network decoder to reduce a measure of loss associated with the loss function(s). Additional detail regarding learning the parameters for the self-supervised image harmonization neural network 108 and its constituent neural networks is provided below with reference to subsequent figures.

As further illustrated in FIG. 2, the image harmonization system 102 performs an act 204 to receive user interaction to modify a digital image. More specifically, the image harmonization system 102 receives an indication (e.g., from the client device 110) of user interaction requesting an operation to generate a harmonized digital image by combining an input digital image (or a portion of an input digital image) with a reference digital image. In some cases, the image harmonization system 102 receives an indication in the form of a selection of a selectable element within a digital image editing interface and/or selection of one or more both of the input digital image and/or the reference digital image. In certain embodiments, the image harmonization system 102 receives an indication of user selection specifying an input digital image (or a portion of an input digital image) to use as a foreground within a final harmonized digital image, along with user selection specifying a reference digital image to use as a background within the final harmonized digital image. In other embodiments, the input digital image comprises a background, while the reference digital image comprises a foreground of the harmonized output.

In any event, as shown in FIG. 2, the image harmonization system 102 performs an act 206 to generate a modified digital image. To elaborate, the image harmonization system 102 utilizes the self-supervised image harmonization neural network 108 (with parameters learned as part of the act 202) to generate a modified digital image. For example, the image harmonization system 102 generates a modified digital image by combining the input digital image and the reference digital image indicated by the user interaction utilizing the self-supervised image harmonization neural network 108.

As illustrated, the image harmonization system 102 utilizes the neural network content encoder to extract a content code from the input digital image (e.g., the digital image of the man in glasses, a hat, and a jacket). In addition, the image harmonization system 102 utilizes the neural network appearance encoder to extract an appearance code from the reference digital image (e.g., the digital image of the Sydney Opera House). Further, the image harmonization system 102 utilizes the neural network decoder to generate the modified digital image (e.g., the digital image of the man with an appearance that matches that of the Sydney Opera House image) by combining the extracted content code and appearance code. Thus, the modified digital image depicts content from the input digital image having an appearance of the reference digital image.

As further illustrated in FIG. 2, the image harmonization system 102 performs an act 208 to generate a harmonized digital image. A harmonized digital image can include a combination of a modified digital image (e.g., as generated via the act 206) and a reference digital image (e.g., from which appearance code is extracted). For instance, a harmonized digital image has an appearance matching that of a reference digital image and also depicts content extracted from an input digital image (as well as content from the reference digital image). In some cases, a harmonized digital image has a size or resolution of the reference digital image (or the input digital image).

To generate a harmonized digital image, the image harmonization system 102 combines a portion of a modified digital image (e.g., as generated via the act 206) with a reference digital image. In some cases, the image harmonization system 102 receives an indication of the portion of the modified digital image to combine. For instance, the image harmonization system 102 receives a binary mask indicating a portion or a region of pixels from the modified digital image to combine with the reference digital image. As shown in FIG. 2, the harmonized digital image depicts the man in the glasses, hat, and jacket together with the Sydney Opera House, all realistically combined in the appearance of the reference digital image of the Sydney Opera House.

In one or more embodiments, the modified digital image has a different resolution than the reference digital image. To accommodate the differences in resolution, the image harmonization system 102 utilizes a fitting function as part of generating a harmonized digital image to fit the modified digital image to the reference digital image (or vice-versa). Additional detail regarding generating a harmonized digital image is provided below with reference to subsequent figures.

Figure 3:
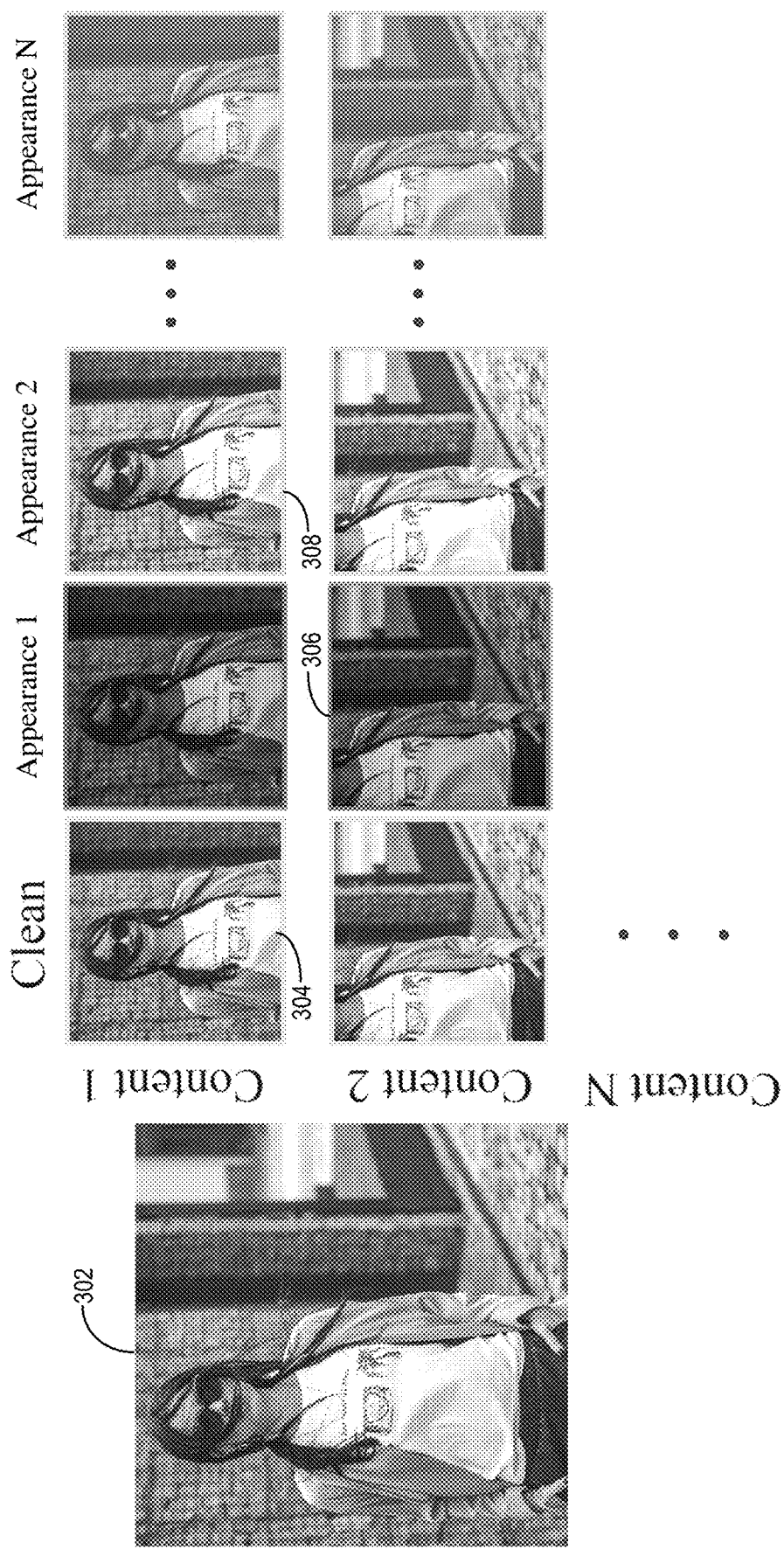
FIG. 3 illustrates an example process of dual data augmentation to generate digital image crops for learning parameters for a self-supervised image harmonization neural network in accordance with one or more embodiments.

As mentioned above, in some embodiments, the image harmonization system 102 generates digital image crops to use as training data to learn parameters for the self-supervised image harmonization neural network 108. In particular, the image harmonization system 102 utilizes a dual data augmentation method to augment content and/or appearance of digital images. FIG. 3 illustrates generating digital image crops using dual data augmentation in accordance with one or more embodiments.

As illustrated in FIG. 3, the image harmonization system 102 dually augments the digital image 302 to generate digital image crops such as the digital image crop 304, the digital image crop 306, and the digital image crop 308. By generating multiple pairs of crops of the digital image 302, as shown, the image harmonization system 102 circumvents the requirement of human-annotated foreground masks (as required by some existing systems) and instead leverages the entire reference digital image for high-quality harmonization results.

As shown in FIG. 3, the image harmonization system 102 generates a number (N) of different content crops, indicated by "Content 1," "Content 2," and so on to "Content N." To generate the digital image crop 304, for instance, the image harmonization system 102 crops the digital image 302 to include only a portion of the digital image 302. Likewise, the image harmonization system 102 generates other digital image crops (e.g., the digital image crops in different rows) by cropping the digital image 302. Thus, as shown by the different rows, the image harmonization system 102, in one or more embodiments, utilizes multi-cropping to generate multiple different crops from one digital image 302. While FIG. 3 illustrates similar sized crops, the image harmonization system 102 can vary the size of the crops from a local region (less than to large global regions. By varying cropping size, the image harmonization system 102 can mimic the diverse range of real training data (e.g., user generated training images) with the generated synthetic training data (the dual augmented crops).

In addition to modifying or augmenting content of the digital image 302 via cropping, the image harmonization system 102 also modifies or augments appearance. More specifically, the image harmonization system 102 modifies the appearance of the digital image 302 (or the digital image crops 306 and 308) by augmenting one or more appearance characteristics, such as color, contrast, brightness and/or saturation. Indeed, as shown in FIG. 3, the image harmonization system 102 generates N different appearances for the digital image crops, indicated by the columns "Appearance 1," "Appearance 2," and so on to "Appearance N."

As mentioned above, to modify or augment color of the digital image 302, in some embodiments, the image harmonization system 102 utilizes a three-dimensional color LUT. In particular, the image harmonization system 102 utilizes a three-dimensional color LUT to map one color space to another. Using a three-dimensional color LUT, the image harmonization system 102 transforms an initial RGB color value of the digital image 302 (or a given digital image crop) to a new RGB color value. In one or more embodiments, a three-dimensional color LUT also represents functions for contrast augmentation, for manipulating the tonal range of the initial digital image 302 (or an initial digital image crop). In certain cases, the image harmonization system 102 utilizes random brightness scaling to modify a brightness associated with the digital image 302 (or the digital image crops 306 and 308).

Using a three-dimensional color LUT provides certain advantages to the image harmonization system 102. For instance, unlike simple color transfer functions used by some conventional systems, the image harmonization system 102 is able to represent complex appearance adjustments. For instance, the image harmonization system 102 modifies the color of one object (e.g., the jacket worn by the woman in FIG. 3) while preserving the color of another object (e.g., the t-shirt under the jacket). Additionally, for a given digital image (or digital image crop), there exists hundreds of LUTs that the image harmonization system 102 can apply to generate augmented versions to dramatically enrich training data. As another advantage, LUT processing is real-time and can be applied as an interactive, on-the-fly data augmentation method.

Figure 4:
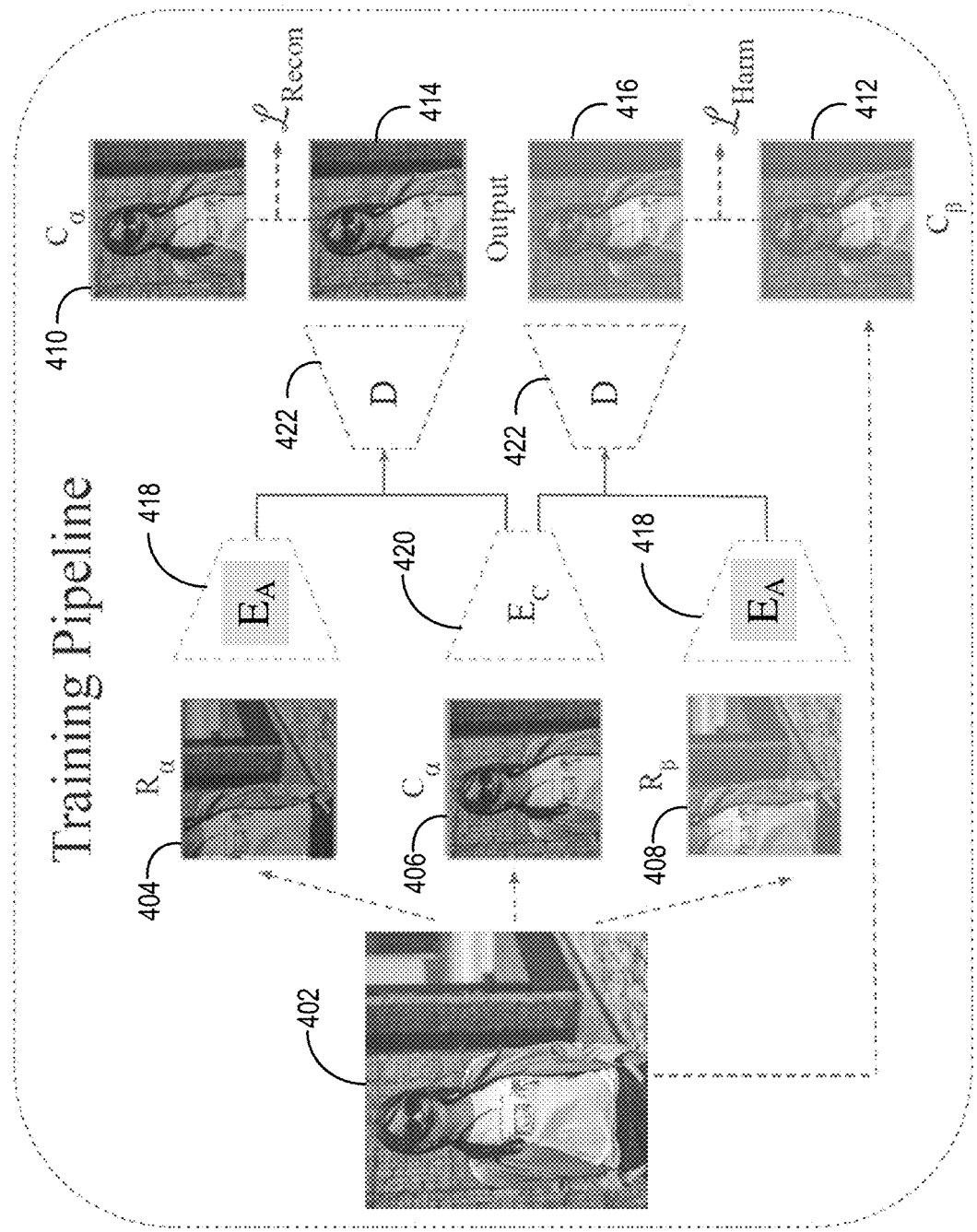
FIG. 4 illustrates an example training pipeline for learning parameters for a self-supervised image harmonization neural network in accordance with one or more embodiments.

As mentioned above, in certain described embodiments, the image harmonization system 102 learns parameters for a self-supervised image harmonization neural network 108. In particular, the image harmonization system 102 utilizes pairs of digital image crops to perform multiple training iterations to learn parameters that result in accurate performance of the self-supervised image harmonization neural network 108. FIG. 4 illustrates a training pipeline for learning parameters of the self-supervised image harmonization neural network 108 in accordance with one or more embodiments.

As illustrated in FIG. 4, the self-supervised image harmonization neural network 108 includes a neural network appearance encoder 418, a neural network content encoder 420, and a neural network decoder 422. As shown in FIG. 4, the image harmonization system 102 generates digital image crops: content α ($C_\alpha$), content β ($C_\beta$), reference α ($R_\alpha$), and reference β ($R_\beta$), where α and β represent different appearances.

FIG. 4 illustrates multiples of the neural network appearance encoder 418 and the neural network decoder 422 to separately portray the different operations (e.g., for a given training iteration) with respect to different digital image crops. Indeed, the image harmonization system 102 trains the neural networks to translate from content α to content β when given reference β, and also to reconstruct content α when given reference α.

To that end, as mentioned above, the image harmonization system 102 selects a pair of digital image crops generated from the initial digital image 402 via the dual data augmentation method. In some embodiments, the image harmonization system 102 selects a pair of digital image crops depicting different pixels but with at least some overlapping portion. For instance, the image harmonization system 102 selects a pair including a content crop 406 and an appearance crop 404 that share some overlapping portion while also depicting different pixels. As shown in FIG. 4, the content crop 406 and the appearance crop 404 share the same appearance α. The image harmonization system 102 additionally selects a pair including the content crop 406 and the appearance crop 408, where the content crop 406 has the appearance α and the appearance crop 408 has the appearance β.

In addition to selecting pairs of digital image crops, the image harmonization system 102 also generates pseudo ground truth crops to use as part of the training pipeline. Indeed, the image harmonization system 102 generates a pseudo ground truth crop by cropping and modifying an appearance of the digital image 402 to depict the content of a content crop and the appearance of an appearance crop. For example, the image harmonization system 102 generates the pseudo ground truth crop 410 depicting the content of the content crop 406 with the appearance of the appearance crop 404 (e.g., the content crop 406 is the same as the pseudo ground truth crop 410 in the embodiment shown in FIG. 4). Similarly, the image harmonization system 102 generates the pseudo ground truth crop 412 depicting the content of the content crop 406 with the appearance of the appearance crop 408.

In some embodiments, the image harmonization system 102 generates pseudo ground crops by performing the same augmentation(s) as done to generate corresponding content crops and appearance crops. For instance, the image harmonization system 102 matches an appearance augmentation used to generate the appearance crop 408 and matches the content augmentation of the content crop 406 to generate the pseudo ground truth crop 412. Thus, the image harmonization system 102 generates the pseudo ground truth crop 412 by determining and matching content and appearance of those crops that are used for extracting codes and combining into the corresponding modified digital image 416.

In these or other embodiments, the image harmonization system 102 generates the pseudo ground truth crop 410 by selecting the content crop 406 as the pseudo ground truth crop 410. Indeed, the image harmonization system 102 matches the content augmentation used to generate the content crop 406 and further matches an appearance of the appearance crop 404 (which is the same appearance a of the content crop 406). Thus, the image harmonization system 102 generates the pseudo ground truth crop 410 by determining and matching content and appearance of those crops that are used for extracting codes and combining into the corresponding modified digital image 414.

In some cases, the different crops and their different appearance-augmented versions with proper perturbations serve as training pseudo triplets. Indeed, the image harmonization system 102 generates pseudo triplets that each include a content crop, an appearance crop, and a pseudo ground truth crop. By generating and utilizing pseudo triplets including pseudo ground truth crops, as opposed to utilizing human-annotated ground truth labels, the image harmonization system 102 improves efficiency by avoiding the computationally expensive process of human annotation.

As illustrated in FIG. 4, the image harmonization system 102 utilizes the neural network content encoder 420 to extract a content code from the content crop 406. In some cases, the neural network content encoder 420 extracts the content code and disentangles the content code from the appearance of the content crop 406. To elaborate, the neural network content encoder 420 extracts features (e.g., latent, hidden features) that represent the content of the content crop 406 but that exclude features representing appearance characteristics of the content crop 406.

In addition, the image harmonization system 102 utilizes the neural network appearance encoder 418 to extract an appearance code from the appearance crop 404. In some cases, the neural network appearance encoder 418 extracts the appearance code and disentangles the appearance code from the content of the appearance crop 404. To elaborate, the neural network appearance encoder 418 extracts features (e.g., latent, hidden features) that represent appearance characteristics of the appearance crop 404 but that exclude features representing content. In a similar fashion, the image harmonization system 102 utilizes the neural network appearance encoder 418 to extract an appearance code from the appearance crop 408.

As further illustrated in FIG. 4, the image harmonization system 102 utilizes the neural network decoder 422 to generate the modified digital image 414 (e.g., a modified crop) from the content code extracted from the content crop 406 and the appearance code extracted from the appearance crop 404. Specifically, the image harmonization system 102 combines the content code and the appearance code for input into the neural network decoder 422. In some cases, the image harmonization system 102 concatenates the content code and the appearance code and inputs the concatenated code into the neural network decoder 422. In turn, the neural network decoder 422 generates the modified digital image 414.

Similarly, the image harmonization system 102 utilizes the neural network decoder 422 to generate the modified digital image 416 from the content code extracted from the content crop 406 and the appearance code extracted from the appearance crop 408. In particular, the image harmonization system 102 concatenates the appearance code and the content code and inputs the concatenated code into the neural network decoder 422. The neural network decoder 422 further generates the modified digital image 416 from the concatenated code.

In addition, the image harmonization system 102 compares modified digital images with corresponding pseudo ground truth crops. For example, for the reconstruction process, the image harmonization system 102 compares the modified digital image 414 with the pseudo ground truth crop 410. In particular, the image harmonization system 102 performs the comparison utilizing a reconstruction loss function to determine a measure of loss associated with one or more components of the self-supervised image harmonization neural network 108. Indeed, the image harmonization system 102 determines how accurately (or inaccurately) the modified digital image 414 resembles the pseudo ground truth crop 410, as expressed in the measure of loss from the loss function.

Additionally, for the harmonization mapping process, the image harmonization system 102 compares the modified digital image 416 with the pseudo ground truth crop 412. In particular, the image harmonization system 102 utilizes a harmonization loss function to determine a measure of loss (or error) associated with one or more components of the self-supervised image harmonization neural network 108 in generating the modified digital image 416.

Based on determining a measure of loss, the image harmonization system 102 further modifies parameters (e.g., internals weights) associated with the self-supervised image harmonization neural network 108. For instance, the image harmonization system 102 modifies parameters to reduce one or more measures of loss determined via the loss function(s), thereby improving accuracy. In some cases, the image harmonization system 102 modifies parameters of the neural network appearance encoder 418, the neural network content encoder 420, and or the neural network decoder 422.

The image harmonization system 102 repeats the process illustrated in FIG. 4 for multiple iterations or epochs. To elaborate, the image harmonization system 102 selects a digital image, generates digital image crops (including content crops, appearance crops, and pseudo ground truth crops), extracts content codes and appearance codes, generates modified digital images from the extracted codes, compares the modified digital images with pseudo ground truth crops (e.g., via one or more loss functions), and modifies parameters to reduce the measure(s) of loss resulting from the comparison. Through this repeated process, the image harmonization system 102 continuously modifies parameters of the neural network decoder 422, the neural network appearance encoder 418, and/or the neural network content encoder 420 until the self-supervised image harmonization neural network 108 ultimately generates modified digital images that are accurate (e.g., when one or more losses associated with loss functions satisfy a threshold measure of loss).

By training the self-supervised image harmonization neural network 108, including the neural network content encoder 420, the neural network appearance encoder 418, and the neural network decoder 422, using the method described in relation to FIG. 4, image harmonization system 102 generates accurate, realistic modified digital images. Indeed, the neural network decoder 422 learns to translate the content C to the output C' so that the output C' matches the appearance of the reference R. For instance, neural network decoder 422 combines the appearance features $E_A(R)$ and the content features $E_C(C)$. In some embodiments, the method is formulated, as given by:

$$C'=D(E_C(C),E_A(R))$$

where C' represents a modified digital image, C represents a content crop, R represents an appearance crop, $E_C(C)$ represents a content code of extracted content features, $E_A(R)$ represents an appearance code of extracted appearance features, and $D(\bullet)$ represents an output from the neural network decoder 422.

In some embodiments, the reconstruction and mapping process illustrated in FIG. 4 can be expressed in formulas, as given by:

$$C'_\beta=D(E_C(C_\alpha), E_A(R_\beta))$$

$$C'_\alpha=D(E_C(C_\alpha), E_A(R_\alpha))$$

$$L_{harm}=\|C'_\beta-C_\beta\|^2$$

$$L_{recon}=\|C'_\alpha-C_\alpha\|^2$$

where $C'_\beta$ represents the modified digital image 416, $C'_\alpha$ represents the modified digital image 414, $E_C(C_\alpha)$ represents the content code extracted from content crop 406, $E_A(R_\beta)$ represents the appearance code extracted from the appearance crop 408, $E_A(R_\alpha)$ represents the appearance code extracted from the appearance crop 404, $L_{harm}$ represents a harmonization loss, $L_{recon}$ represents a reconstruction loss, and the remaining terms are defined above.

Because the neural network appearance encoder 418 seeks to capture appearance information from a given image, it is expected to extract similar representations when receiving different crops with the same appearance characteristics. Meanwhile the neural network content encoder 420 seeks to capture the same features given the same crop with different appearances. Thus, the image harmonization system 102 utilizes a disentanglement loss to disentangle the content and the appearance, as given by:

$$L_{dis}=\|E_C(C_\alpha)-E_C(C_\beta)\|^2+\|E_A(C_\alpha)-E_A(R_\alpha)\|^2$$

where $L_{dis}$ represents the disentanglement loss, $E_C(C_\alpha)$ represents a content code extracted from the content crop 406, $E_C(C_\beta)$ represents a content code extracted from the pseudo ground truth crop 412, $E_A(C_\alpha)$ represents an appearance code extracted from the content crop 406, and $E_A(R_\alpha)$ represents an appearance code extracted from the appearance crop 404.

In certain embodiments, the image harmonization system 102 utilizes a combined loss function. In particular, the image harmonization system 102 combines the disentanglement loss, the harmonization loss, and the reconstruction loss into a single overall loss function. For example, the overall loss function is represented by:

$$\text{Loss} = L_{harm} + w_1 * L_{recon} w_2 * L_{dis}$$

where Loss represents the overall loss, $w_1$ represents a reconstruction loss weight, $w_2$ represents a disentanglement loss weight, and the remaining terms are defined above. In some cases, the image harmonization system 102 sets $w_1$ to 0.4 and sets $w_2$ to 0.05.

In one or more embodiments, the image harmonization system 102 trains the self-supervised image harmonization neural network 108 from the scratch for 70 epochs with the learning rate of 2e-4, followed by another 30 epochs with the learning rate linearly decayed to 0. In one or more embodiments, the image harmonization system 102 utilizes a scale jittering range of [256, 320] and then crop a 224×224 image in the training stage. In one or more embodiments, the image harmonization system 102 also utilizes the Adam optimizer and with a batch size of 64.

Figure 5:
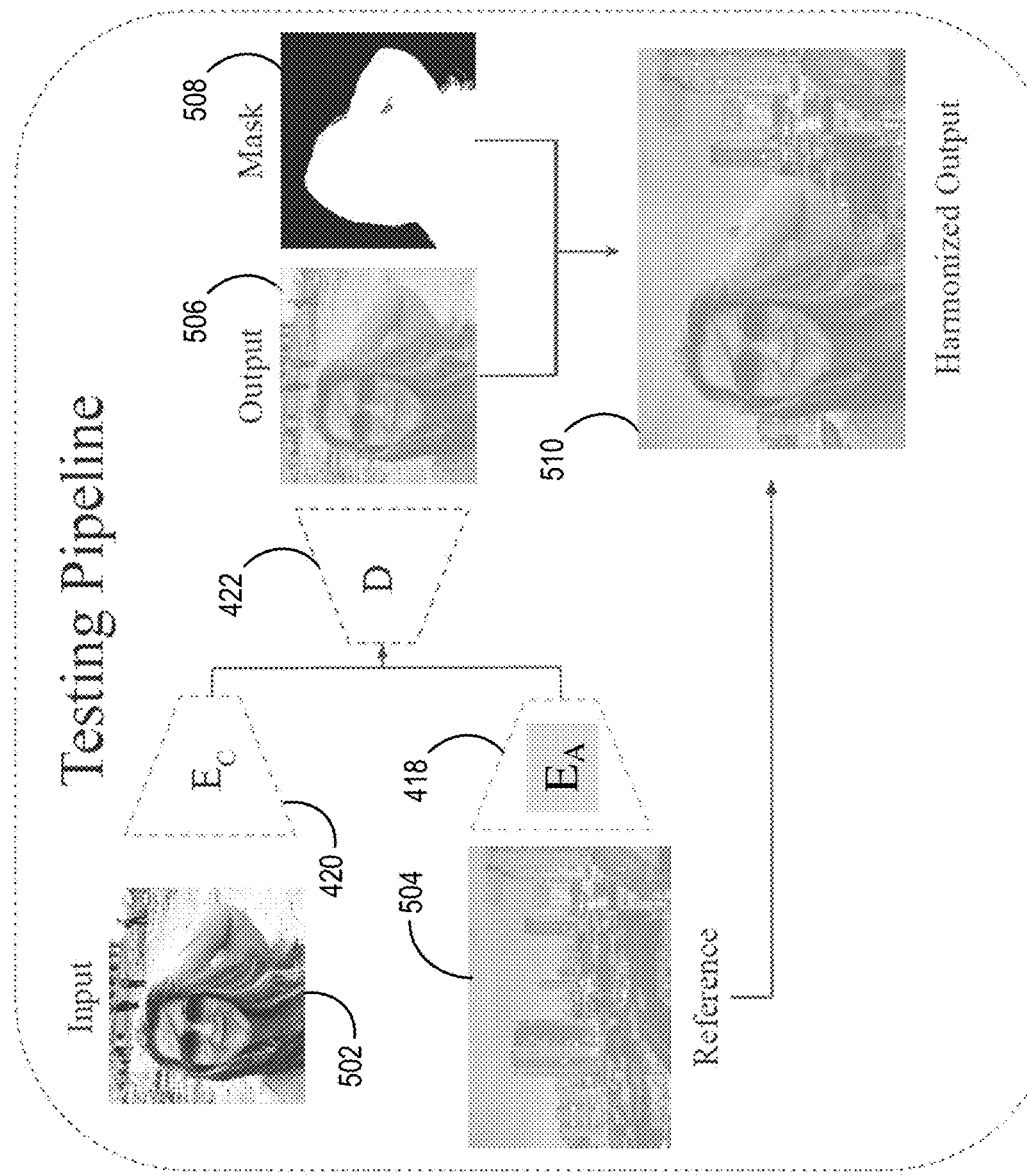
FIG. 5 illustrates an example testing pipeline for implementing a self-supervised image harmonization neural network to generate a harmonized digital image in accordance with one or more embodiments.

As mentioned above, in one or more embodiments, the image harmonization system 102 utilizes a self-supervised image harmonization neural network 108 with parameters learned through the method described in relation to FIG. 4. In particular, the image harmonization system 102 utilizes the self-supervised image harmonization neural network 108 to generate a modified digital image and to further generate a harmonized digital image from the modified digital image. FIG. 5 illustrates generating a harmonized digital image 510 in accordance with one or more embodiments.

As illustrated in FIG. 5, the image harmonization system 102 identifies an input digital image 502. In particular, the image harmonization system 102 receives the input digital image 502 from the client device 110 as an upload (e.g., of a captured digital image) or a selection from a repository of digital images. For example, the image harmonization system 102 receives the input digital image 502 along with a request to combine the input digital image 502 with a reference digital image.

As also illustrated in FIG. 5, the image harmonization system 102 identifies a reference digital image 504. In particular, the image harmonization system 102 receives the reference digital image 504 from the client device 110 as an upload or a selection from a repository of digital images. In some embodiments, the image harmonization system 102 receives an indication of user interaction requesting to use the reference digital image 504 as a background when combining with the input digital image 502 (e.g., a foreground image).

Based on user interaction for generating a modified digital image (e.g., as a combination of the input digital image 502 and the reference digital image 504), the image harmonization system 102 utilizes self-supervised image harmonization neural network 108 to generate the modified digital image 506. More specifically, the image harmonization system 102 utilizes the neural network content encoder 420 to extract a content code from the input digital image 502. In addition, the image harmonization system 102 utilizes the neural network appearance encoder 418 to extract an appearance code from the reference digital image 504.

Further, the image harmonization system 102 concatenates the content code and the appearance code to input into the neural network decoder 422. Thus, the image harmonization system 102 utilizes the neural network decoder 422 to generate the modified digital image 506 from the concatenated code of content and appearance features. As shown, the modified digital image 506 depicts the content of the input digital image 502 but in the appearance of the reference digital image 504.

As further illustrated in FIG. 5, the image harmonization system 102 generates the harmonized digital image 510 from the modified digital image 506. More specifically, the image harmonization system 102 identifies a portion of the modified digital image 506 to combine with the reference digital image 504. For example, the image harmonization system 102 identifies a portion of the modified digital image 506 to use as a foreground portion of the harmonized digital image 510.

As shown, the image harmonization system 102 receives a mask 508 to indicate the portion of the modified digital image 506 to combine with the reference digital image 504. For instance, the image harmonization system 102 receives an indication of user interaction (e.g., via an image editing interface on the client device 110) to select a portion of the modified digital image to define the mask. In some cases, the image harmonization system 102 receives user interaction indicating a portion of the input digital image 502 to then translate into a corresponding portion of the modified digital image 506 for combining with the reference digital image 504.

For example, in one or more embodiments, the image harmonization system 102 utilizes a segmentation neural network to generate the mask 508. More example, the image harmonization system 102 utilizes a salient object segmentation neural network, such as that described by Pao et al. in U.S. patent application Ser. No. 15/967,928 filed on May 1, 2018, entitled ITERATIVELY APPLYING NEURAL NETWORKS TO AUTOMATICALLY IDENTIFY PIXELS OF SALIENT OBJECTS PORTRAYED IN DIGITAL IMAGES, the contents of which are expressly incorporated herein by reference in their entirety. In another embodiment, the image harmonization system 102 utilizes an image mask generation system, such as that described by Zhang et al. in U.S. patent application Ser. No. 16/988,055 filed on Aug. 7, 2020, entitled GENERATING AN IMAGE MASK FOR A DIGITAL IMAGE BY UTILIZING A MULTI-BRANCH MASKING PIPELINE WITH NEURAL NETWORKS, the contents of which are expressly incorporated herein by reference in their entirety. In yet another embodiment, the image harmonization system 102 utilizes a multi-model object selection system, such as that described by Price et al. in U.S. Patent Application Publication No. 2019/0236394 filed on Apr. 5, 2019, entitled UTILIZING INTERACTIVE DEEP LEARNING TO SELECT OBJECTS IN DIGITAL VISUAL MEDIA, the contents of which are expressly incorporated herein by reference in their entirety.

In some embodiments, the self-supervised image harmonization neural network 108 operates on digital images in relatively low resolutions (e.g., 256×256 pixels). Thus, to generate the harmonized digital image 510 in high resolution (e.g., 4k or 8k) the image harmonization system 102 learns a fitting function to adapt resolutions.

For example, the image harmonization system 102 utilizes a fitting function to adapt resolutions. In some embodiments, the image harmonization system 102 utilizes the fitting function to adapt the resolution of the modified digital image 506 to fit the reference digital image 504 and thereby generate a cohesive, realistic harmonized digital image 510 (without distorting portions of the modified digital image 506 or the reference digital image 504). In certain cases, the image harmonization system 102 utilizes a fitting function given by:

$$F(A_{low}) = A_{low}'$$

where F represents the fitting function for mapping digital image $A_{low}$ to $A_{low}'$, and where $A_{low}$ represents an input digital image having a low resolution (e.g., 256×256 pixels) and $A_{low}'$ represents a modified digital image having the same low resolution.

Upon learning the fitting function F, the image harmonization system 102 further applies the fitting function on high resolution images. For example, the image harmonization system 102 generates the harmonized digital image 510 utilizing the fitting function in accordance with:

$$F(A_{high}) = A_{high}'$$

where $A_{high}$ represents a high resolution input digital image (e.g., 4k) and $A_{high}'$ represents a high resolution modified digital image. Thus, by utilizing the fitting function, the image harmonization system 102 adapts the modified digital image 506 to combine with the reference digital image 504 in a high resolution.

In some cases, the modified digital image 506 has the same size or resolution as the input digital image 502. To generate the harmonized digital image 510, however, the image harmonization system 102 adapts the resolution of the modified digital image 506 (e.g., to have the resolution of the reference digital image 504). For example, the image harmonization system 102 utilizes the fitting function to adapt the resolution to generate a coherent harmonized digital image 510, where the masked portion of the modified digital image 506 comprises the foreground, and the reference digital image 504 comprises the background.

Figure 6:
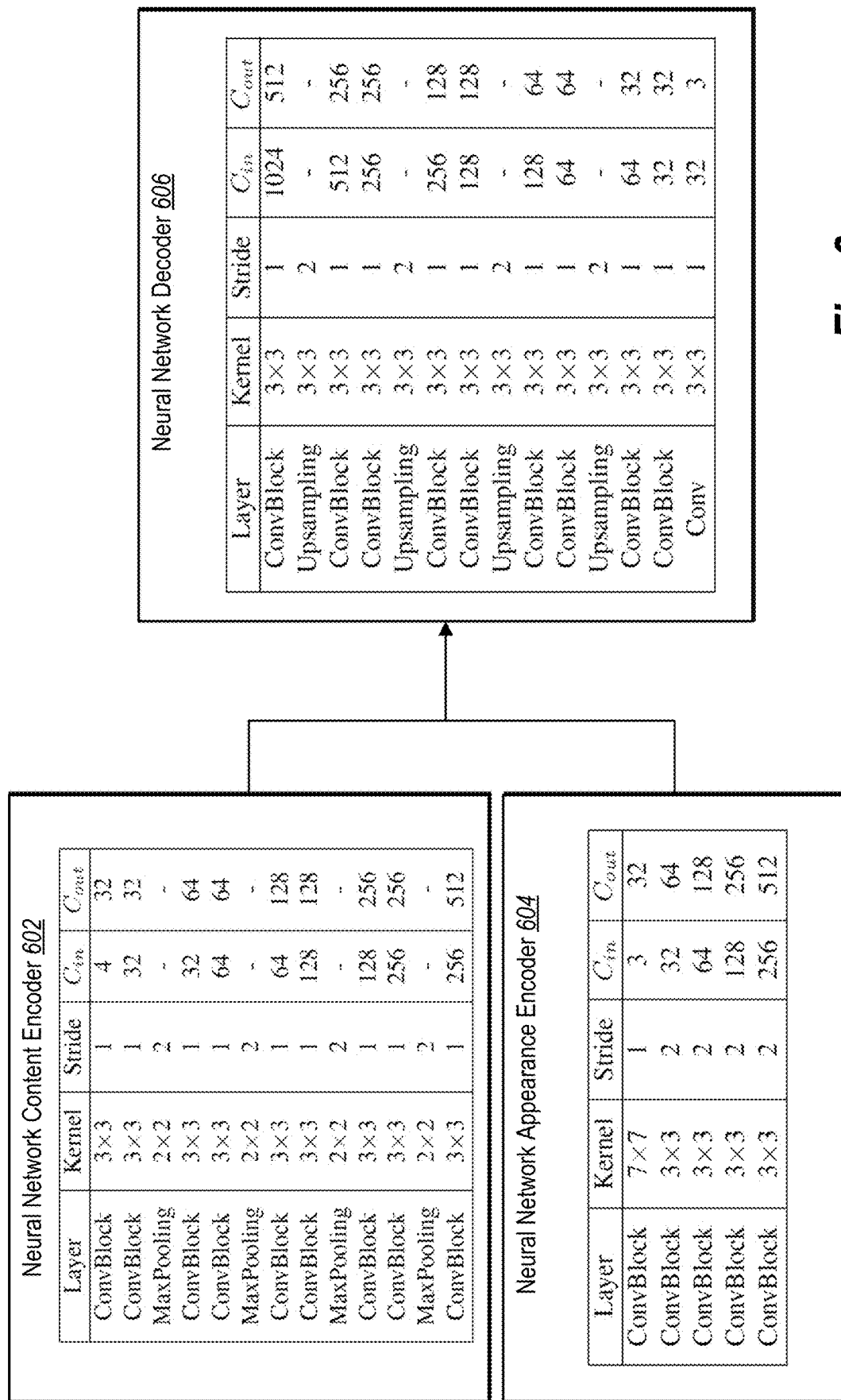
FIG. 6 illustrates an example architecture of the self-supervised image harmonization neural network in accordance with one or more embodiments.

As mentioned above, the image harmonization system 102 utilizes a self-supervised image harmonization neural network 108 that consists of a neural network appearance encoder 418, a neural network content encoder 420, and a neural network decoder 422. In particular, the image harmonization system 102 utilizes these neural networks which each have their own architecture as part of the self-supervised image harmonization neural network 108. FIG. 6 illustrates the various architectures of the neural networks within the self-supervised image harmonization neural network 108 in accordance with one or more embodiments.

As illustrated in FIG. 6, the neural network content encoder 602 (e.g., the neural network content encoder 420) includes a number of layers, where each layer is made up of different blocks of respective kernel sizes, strides, and resolutions. For example, the neural network content encoder 602 includes max pooling layers and convolutional layers in a particular arrangement. As shown, the "ConvBlock" term in FIG. 6 represents a convolutional-LeakyReLu-BatchNorm block.

As also illustrated in FIG. 6, embodiments of the neural network appearance encoder 604 (e.g., the neural network appearance encoder 418) include five layers. For example, the neural network appearance encoder 604 includes a convolutional ConvBlock layer with a 7×7 kernel, in addition to four ConvBlock layers with 3×3 kernels, each with their own respective resolutions for input and output.

Further, the neural network decoder 606 (e.g., the neural network decoder 422) includes a number of layers, including ConvBlock layers, Upsampling layers, and a single convolutional layer. As shown in FIG. 6, each layer has a 3×3 kernel with different resolutions and strides.

Figure 7:
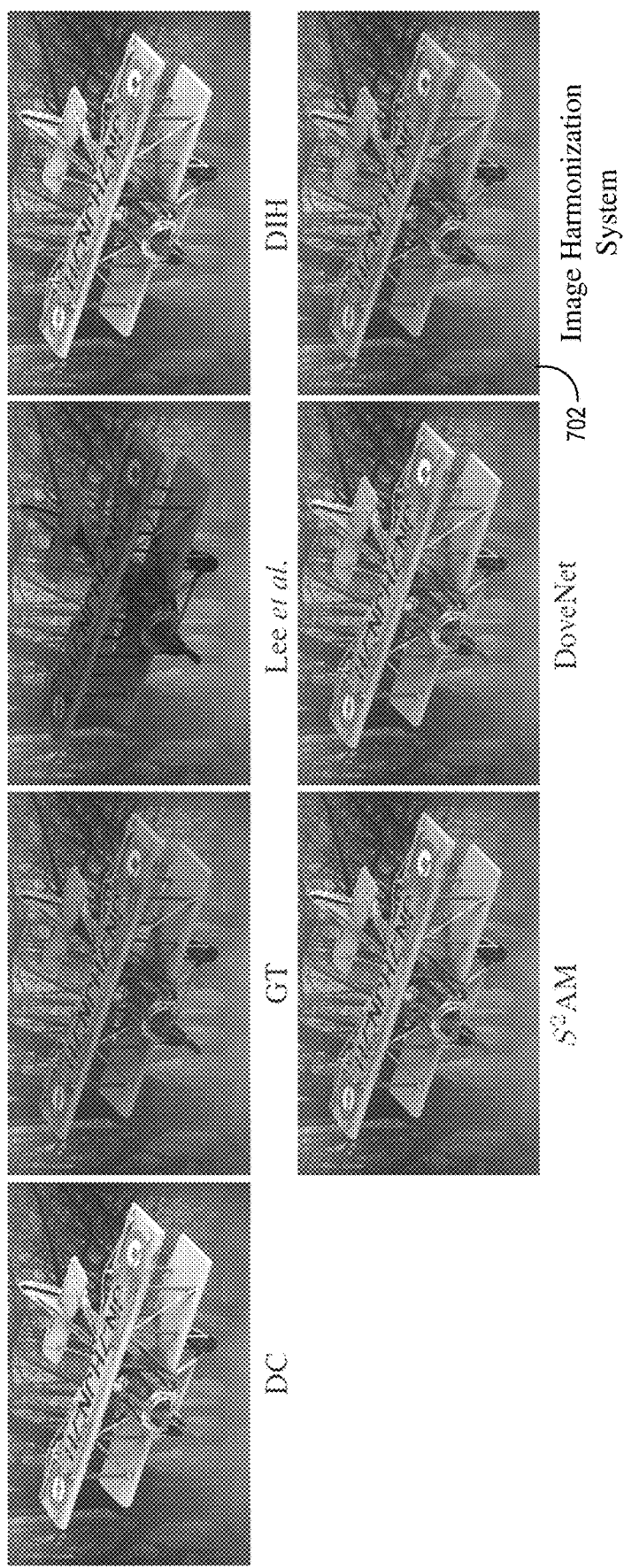
FIG. 7 illustrates a comparison of composited digital image generated by the image harmonization system and by conventional systems in accordance with one or more embodiments.
Figure 8:
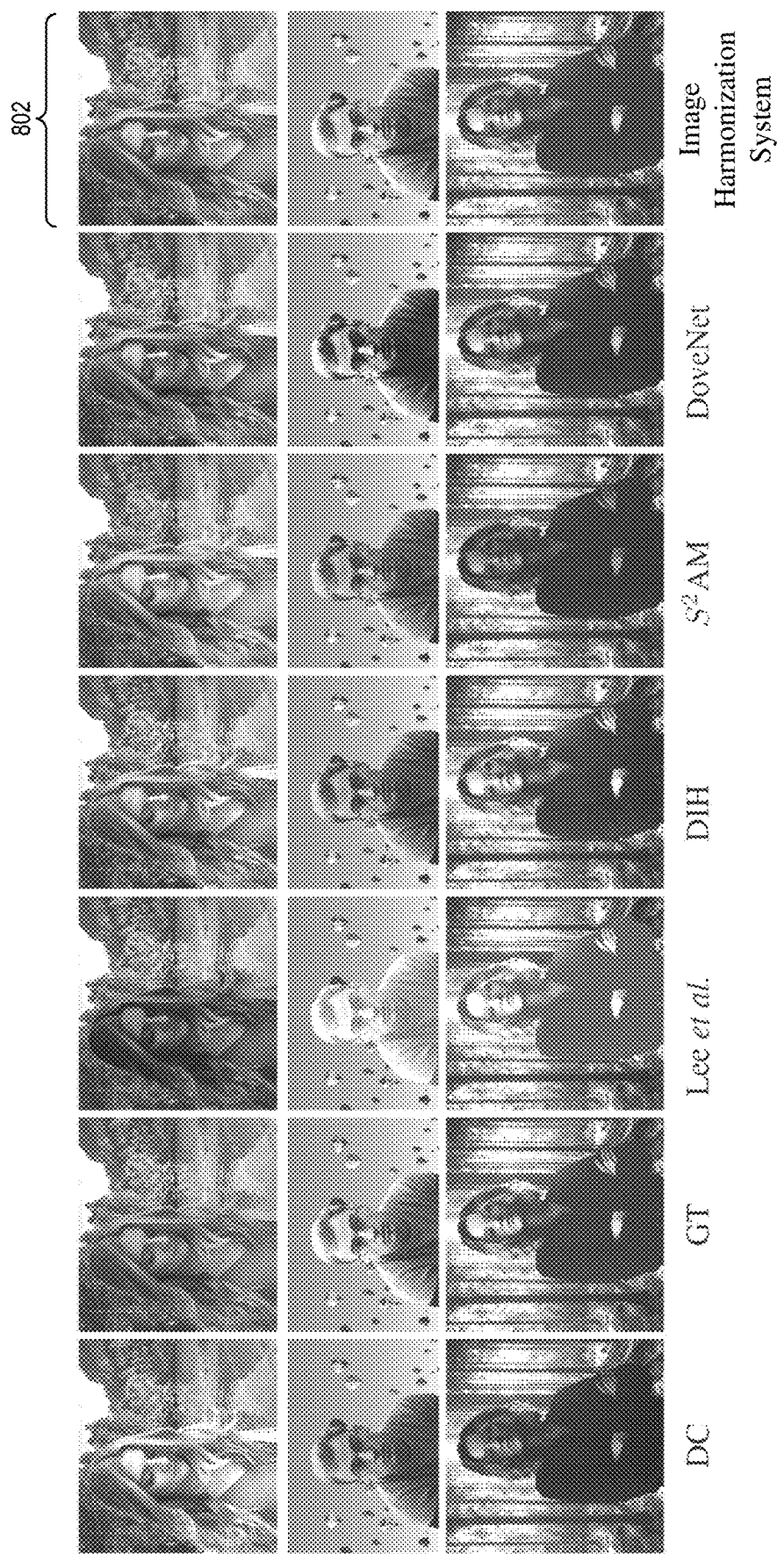
FIG. 8 illustrates a comparison of composited digital image generated by the image harmonization system and by conventional systems in accordance with one or more embodiments.

As mentioned above, the image harmonization system 102 provides improved results over conventional digital image editing systems. In particular, experimenters have demonstrated the improved accuracy of the image harmonization system 102 in generating harmonized digital images through image compositing. FIGS. 7-9 illustrates results from experiments done by researchers to illustrate the improvement of the image harmonization system 102 in accordance with one or more embodiments.

To obtain results for the experiment, researchers created a dataset of digital images for testing. Specifically, researchers built a new database called the Real-world Harmonization dataset to bridge the gap between conventional evaluation protocols and real image harmonization demands. Because the image harmonization system 102 requires only self-supervision using pseudo ground truths (rather than labeled training data), researchers were able to collect a larger-scale unlabeled training set of images with diverse semantics, environmental lighting conditions, and content. For the experiments, the training set includes 81,917 images from several datasets across a wide range of content such as mountains, rivers, sky, general objects, and human portraits under a variety of lighting conditions. Additionally, researchers also collected 100 three-dimensional color LUTs.

As illustrated in FIG. 7, the image harmonization system 102 operates not only with images of people but with images of other objects as well. For instance, the image harmonization system 102 generates the harmonized digital image 702 by compositing a digital image of a biplane (e.g., as an input digital image) with a digital image of a forest (e.g., as a reference digital image). Compared to the other composited digital images in FIG. 7, the harmonized digital image 702 is the most accurate and realistic, with improved appearance matching of the foreground biplane with the background forest. Indeed, the image harmonization system 102 provides improved results over the illustrated conventional systems, including direct compositing ("DC"), ground truth harmonization ("GT") annotated by human users, automatic content-aware color and tone stylization as described by Lee et al. in *Automatic Content-Aware Color And Tone Stylization*, computer vision and pattern recognition, pages 2470-2478, 2016 ("Lee et al."), deep image harmonization as described by Tsai et al., in *Deep Image Harmonization*, In Proceedings of the IEEE Conference on Computer Vision and Pattern Recognition, pages 3789-3797, 2017 ("DIH"), improving the harmony of the composite image by a spatial-separated attention module as described by Cun et al., in *Improving The Harmony Of The Composite Image By Spatial-Separated Attention Module*, IEEE Transactions on Image Processing, 29: 4759-4771, 2020 ("S²AM"), and deep image harmonization via domain verification as described by Cong et al., in *Dovenet: Deep Image Harmonization Via Domain Verification*, In Proceedings of the IEEE/CVF Conference on Computer Vision and Pattern Recognition, pages 8394-8403, 2020 ("DoveNet").

Continuing the comparison with these conventional systems, the image harmonization system 102 further improves the quality and accuracy of image compositing in the human image domain as well. FIG. 8 illustrates a comparison of composited digital images of human portraits in accordance with one or more embodiments. As shown, the column 802 represents harmonized digital images generated by the image harmonization system 102, while every other column includes digital images generated by the respective system labeled below and described above.

Similar to the discussion in relation to FIG. 7, the harmonized digital images in the column 802 are more accurate and more realistic than the digital images in the other columns. Indeed, while it is difficult to tell in black and white, the harmonized digital images in the column 802 depict the human portraits in the foreground (e.g., taken from input images) with matching of appearance characteristics to the background settings (e.g., the forest or the balloons) than the digital images in the other columns.

To further illustrate the improvements of the image harmonization system 102 over conventional systems, researchers generated empirical metrics in addition to the generate image results of FIGS. 7 and 8. For example, FIG. 9 illustrates a table 902 of performance metrics associated with digital image compositing for different systems in accordance with one or more embodiments. Specifically, the table 902 illustrates columns for metrics such as peak signal-to-noise ratio ("PSNR"), mean squared error ("MSE"), structural similarity index measure ("SSIM"), and learned perceptual patch similarity ("LPIPS").

As illustrated in FIG. 9, the image harmonization system 102 exhibits improved performance over the conventional systems in every metric (e.g., as shown in the bottom row of the table 902). Indeed, as indicated by the table 902, higher values for PSNR indicate improved performance. Likewise, higher values for SSIM also indicate improved performance, while lower values for both MSE and LPIPS indicate improved performance.

Figure 10:
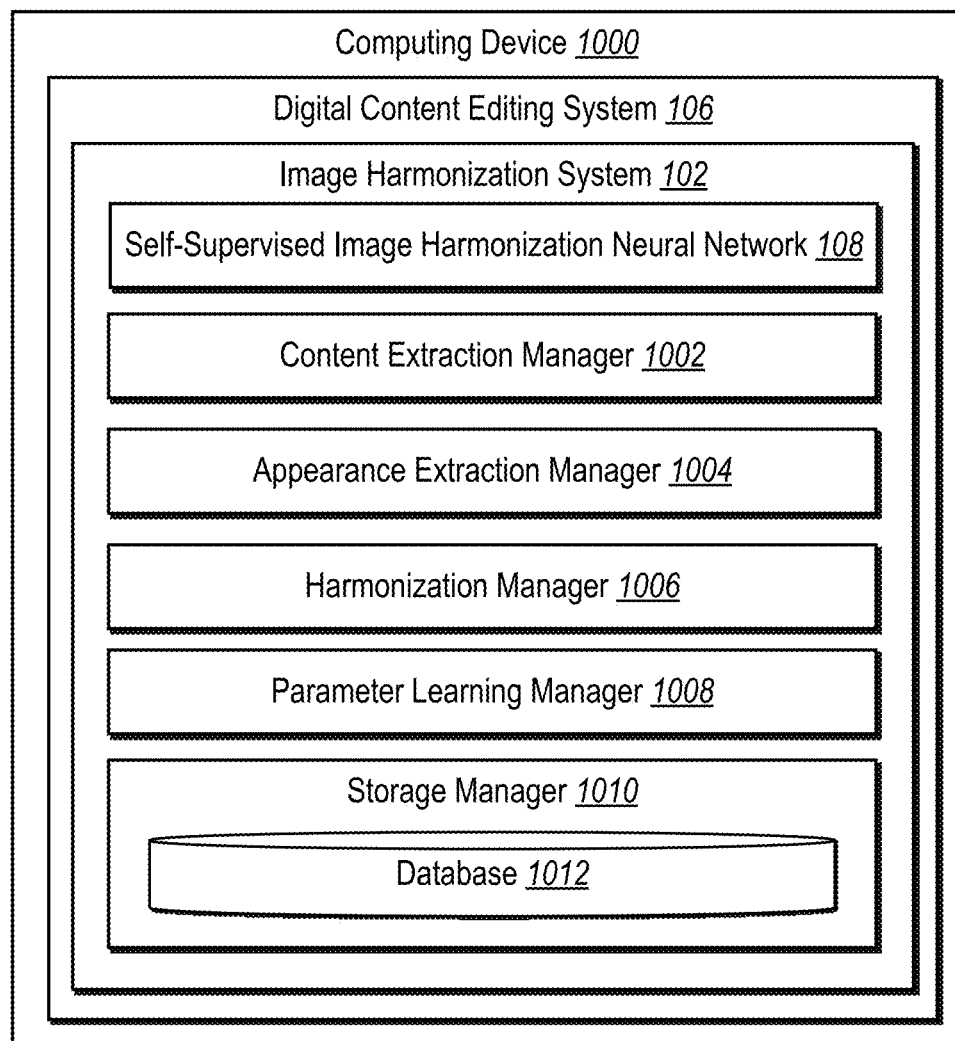
FIG. 10 illustrates a schematic diagram of an image harmonization system in accordance with one or more embodiments.

Looking now to FIG. 10, additional detail will be provided regarding components and capabilities of the image harmonization system 102. Specifically, FIG. 10 illustrates an example schematic diagram of the image harmonization system 102 on an example computing device 1000 (e.g., one or more of the client device 110 and/or the server device(s) 104). As shown in FIG. 10, the image harmonization system 102 includes the self-supervised image harmonization neural network 108 as described above, a content extraction manager 1002, an appearance extraction manager 1004, a harmonization manager 1006, a parameter learning manager 1008, and a storage manager 1010.

As just mentioned, the image harmonization system 102 includes a content extraction manager 1002. In particular, the content extraction manager 1002 manages, maintains, extracts, generates, determines, encodes, produces, or identifies content associated with a digital image. For example, the content extraction manager 1002 extracts a content code from an input digital image to indicate a geometric layout of objects depicted within the digital image. In some embodiments, the content extraction manager 1002 utilizes a neural network content encoder of the self-supervised image harmonization neural network 108 to extract a content code disentangled from appearance.

As shown, the image harmonization system 102 also includes an appearance extraction manager 1004. In particular, the appearance extraction manager 1004 manages, maintains, extracts, generates, determines, encodes, produces, or identifies appearance associated with a digital image. For example, the appearance extraction manager 1004 extracts an appearance code from a reference digital image that indicates appearance characteristics such as color, contrast, brightness, and saturation. In some cases, the appearance extraction manager 1004 extracts the appearance code disentangled from content of the reference digital image. In some embodiments, the appearance extraction manager 1004 utilizes a neural network appearance encoder of the self-supervised image harmonization neural network 108 to extract an appearance code disentangled from content.

As further illustrated in FIG. 10, the image harmonization system 102 includes a harmonization manager 1006. In particular, the harmonization manager 1006 manages, maintains, generates, produces, combines, or identifies a harmonized digital image. For example, the harmonization manager 1006 generates a modified digital image by combining a content code and an appearance code utilizing a neural network decoder of the self-supervised image harmonization neural network 108. Additionally, the harmonization manager 1006 generates a harmonized digital image by combining a portion of the modified digital image with a reference digital image such that the harmonized digital image depicts content of both the modified digital image and the reference digital image, all in the appearance of the reference digital image.

Further, the image harmonization system 102 includes a parameter learning manager 1008. In particular, the parameter learning manager 1008 manages, maintains, learns, trains, tunes, modifies, determines, generates, or identifies parameters associated with the self-supervised image harmonization neural network 108. For example, the parameter learning manager 1008 learns parameters for a neural network content encoder, a neural network appearance encoder, and a neural network decoder by utilizing a training process as described herein.

The image harmonization system 102 further includes a storage manager 1010. The storage manager 1010 operates in conjunction with or include one or more memory devices such as the database 1012 (e.g., the database 114) that store various data such as a repository of digital images and a self-supervised image harmonization neural network (e.g., the self-supervised image harmonization neural network 108). The storage manager 1010 (e.g., via a non-transitory computer memory/one or more memory devices) stores and maintains data associated with generating harmonized digital images and learning parameters for various neural networks that are part of the self-supervised image harmonization neural network 108.

In one or more embodiments, each of the components of the image harmonization system 102 are in communication with one another using any suitable communication technologies. Additionally, the components of the image harmonization system 102 is in communication with one or more other devices including one or more client devices described above. It will be recognized that although the components of the image harmonization system 102 are shown to be separate in FIG. 10, any of the subcomponents may be combined into fewer components, such as into a single component, or divided into more components as may serve a particular implementation. Furthermore, although the components of FIG. 10 are described in connection with the image harmonization system 102, at least some of the components for performing operations in conjunction with the image harmonization system 102 described herein may be implemented on other devices within the environment.

The components of the image harmonization system 102 can include software, hardware, or both. For example, the components of the image harmonization system 102 can include one or more instructions stored on a computer-readable storage medium and executable by processors of one or more computing devices (e.g., the computing device 1000). When executed by the one or more processors, the computer-executable instructions of the image harmonization system 102 can cause the computing device 1000 to perform the methods described herein. Alternatively, the components of the image harmonization system 102 can comprise hardware, such as a special purpose processing device to perform a certain function or group of functions. Additionally, or alternatively, the components of the image harmonization system 102 can include a combination of computer-executable instructions and hardware.

Furthermore, the components of the image harmonization system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the image harmonization system 102 may be implemented as part of a stand-alone application on a personal computing device or a mobile device. Alternatively, or additionally, the components of the image harmonization system 102 may be implemented in any application that allows creation and delivery of marketing content to users, including, but not limited to, applications in ADOBE® EXPERIENCE MANAGER and CREATIVE CLOUD®, such as ADOBE® STOCK, PHOTOSHOP®, LIGHTROOM®, and INDESIGN®. "ADOBE," "ADOBE EXPERIENCE MANAGER," "CREATIVE CLOUD," "ADOBE STOCK," "PHOTOSHOP," "LIGHTROOM," and "INDESIGN" are either registered trademarks or trademarks of Adobe Inc. in the United States and/or other countries.

FIGS. 1-10 the corresponding text, and the examples provide a number of different systems, methods, and non-transitory computer readable media for generating a harmonized digital image by extracting and combining content codes and appearance codes from different digital images using a self-supervised image harmonization neural network. In addition to the foregoing, embodiments can also be described in terms of flowcharts comprising acts for accomplishing a particular result. For example, FIGS. 11-12 illustrate flowcharts of example sequences or series of acts in accordance with one or more embodiments.

Figure 11:
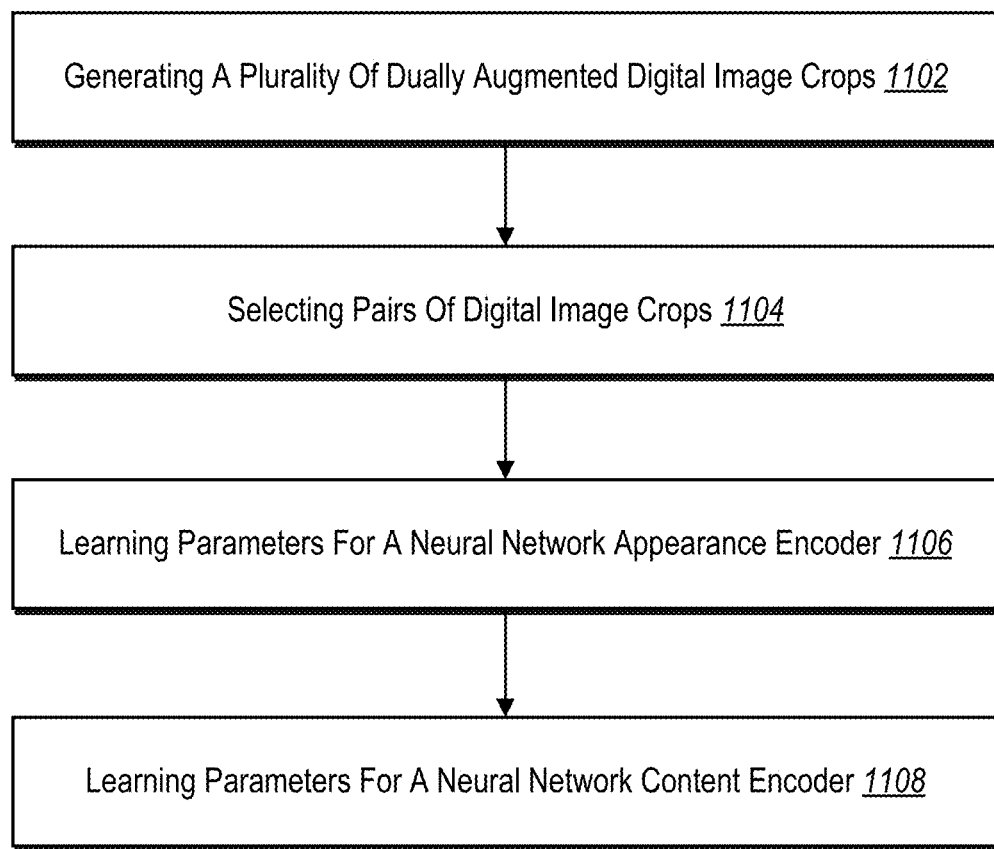
FIG. 11 illustrates a flowchart of a series of acts for learning parameters for a self-supervised image harmonization neural network in accordance with one or more embodiments.
Figure 12:
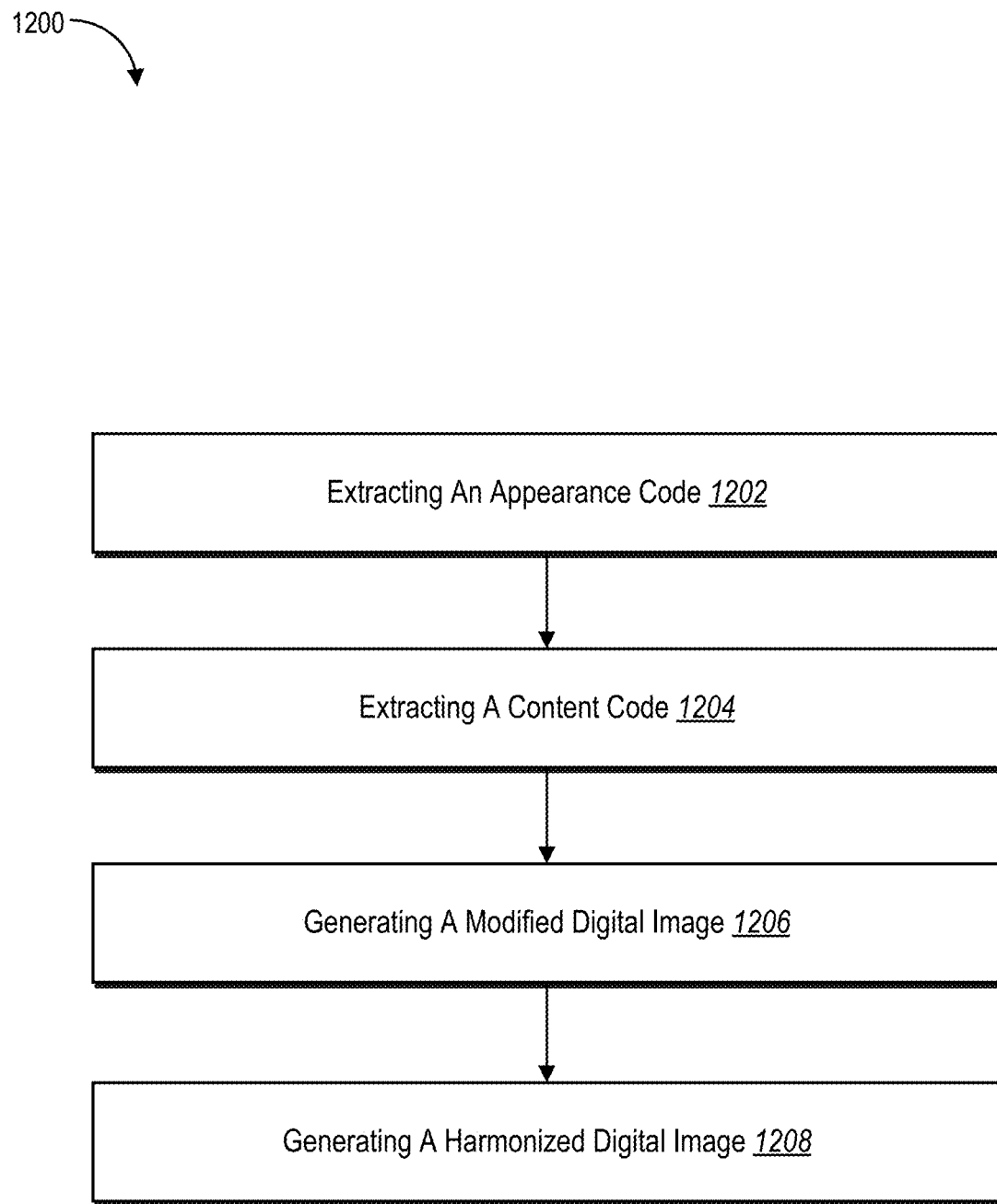
FIG. 12 illustrates a flowchart of a series of acts for generating a harmonized digital image by extracting and combining content codes and appearance codes utilizing a self-supervised image harmonization neural network in accordance with one or more embodiments.

While FIGS. 11-12 illustrates acts according to various embodiments, alternative embodiments may omit, add to, reorder, and/or modify any of the acts shown in FIGS. 11-12. The acts of FIGS. 11-12 can be performed as part of a method. Alternatively, a non-transitory computer readable medium can comprise instructions, that when executed by one or more processors, cause a computing device to perform the acts of FIGS. 11-12. In still further embodiments, a system can perform the acts of FIGS. 11-12. Additionally, the acts described herein may be repeated or performed in parallel with one another or in parallel with different instances of the same or other similar acts.

FIG. 11 illustrates an example series of acts 1100 of learning parameters for a self-supervised image harmonization neural network. In particular, the series of acts 1100 includes an act 1102 of generating a plurality of augmented digital image crops. For example, the act 1102 involves generating, from a digital image, a plurality of digital image crops utilizing dual data augmentation to augment one or more of content or appearance of the plurality of digital image crops. In some cases, the act 1102 involves utilizing the dual data augmentation to augment appearance utilizing a three-dimensional lookup table to modify colors of the digital image.

In some embodiments, the act 1102 involves utilizing the dual data augmentation to: generate, from the digital image, a first digital image crop and a second digital image crop, the second digital image crop depicting one or more different pixels than the first digital image crop; augment an appearance of the first digital image crop by modifying one or more appearance characteristics of the first digital image crop; and augment an appearance of the second digital image crop by modifying one or more appearance characteristics of the second digital image crop differently from the appearance characteristics of the first digital image crop.

In one or more embodiments, the act 1102 involves utilizing the dual data augmentation to: generate, from the digital image, a first appearance-augmented digital image by performing a first modification to one or more appearance characteristics of the digital image; generate, from the digital image, a second appearance-augmented digital image different from the first appearance-augmented digital image by performing a second modification to one or more appearance characteristics of the digital image; and crop the first appearance-augmented digital image and the second appearance-augmented digital image such that the first appearance-augmented digital image and the second appearance-augmented digital image depict at least some overlapping portion.

As shown, the series of acts 1100 also includes an act 1104 of selecting pairs of digital image crops. In particular, the act 1104 involves selecting, from among the plurality of digital image crops, pairs of digital image crops comprising content crops and appearance crops. For example, the act 1104 involves selecting, from among the plurality of digital image crops, a content crop comprising a cropped portion of the digital image for input into the neural network content encoder. In some embodiments, the act 1104 involves selecting, from among the plurality of digital image crops, an appearance crop comprising an appearance-augmented portion of the digital image for input into the neural network appearance encoder.

Additionally, the series of acts 1100 includes an act 1106 of learning parameters for a neural network appearance encoder. In particular, the act 1106 involves learning, from the pairs of digital image crops, parameters for a neural network appearance encoder that disentangles appearance from content. For example, the act 1106 includes generating, by cropping and augmenting an appearance of a portion of the digital image, a pseudo ground truth crop comprising a content corresponding to the content code of the modified digital image and an appearance corresponding to the appearance code of the modified digital image; comparing the modified digital image with the pseudo ground truth crop utilizing a harmonization loss function; and modifying the parameters for the neural network appearance encoder to reduce a measure of loss associated with the harmonization loss function.

As further shown in FIG. 11, the series of acts 1100 includes an act 1108 of learning parameters for a neural network content encoder. In particular, the act 1108 involves learning, from the pairs of digital image crops, parameters for a neural network content encoder that disentangles content from appearance. For example, the act 1108 involves generating, by cropping and augmenting an appearance of a portion of the digital image, a pseudo ground truth crop comprising a content corresponding to the content code of the modified digital image and an appearance corresponding to the appearance code of the modified digital image; comparing the modified digital image with the pseudo ground truth crop utilizing a reconstruction loss function; and modifying the parameters for the neural network content encoder to reduce a measure of loss associated with the reconstruction loss function.

In some embodiments, the series of acts 1100 includes an act of extracting a content code from a content crop of the plurality of digital image crops utilizing the neural network content encoder. In addition, the series of acts 1100 includes an act of extracting an appearance code from an appearance crop of the plurality of digital image crops utilizing the neural network appearance encoder. Further, the series of acts 1100 includes an act of generating a modified digital image from the content crop and the appearance crop by combining the content code and the appearance code utilizing a neural network decoder.

FIG. 12 illustrates an example series of acts 1200 of generating a harmonized digital image by extracting and combining content codes and appearance codes from different digital images using a self-supervised image harmonization neural network. In particular, the series of acts 1200 includes an act 1202 of extracting an appearance code. For example, the act 1202 involves extracting, from a reference digital image, an appearance code disentangled from a content of the reference digital image utilizing a neural network appearance encoder. In some cases, the act 1202 involves utilizing the neural network appearance encoder to extract features representing color of the reference digital image without representing texture. In these or other cases, the act 1202 involves utilizing the neural network appearance encoder to extract features representing one or more of color, contrast, brightness, or saturation of the first digital image.

In addition, the series of acts 1200 includes an act 1204 of extracting a content code. In particular, the act 1204 involves extracting, from an input digital image, a content code disentangled from an appearance of the input digital image utilizing a neural network content encoder. For example, the act 1204 involves utilizing the neural network content encoder to extract features representing a geometric layout of the input digital image. In some cases, the act 1204 involves utilizing the neural network content encoder to extract features representing a geometric layout of the second digital image.

Further, the series of acts 1200 includes an act 1206 of generating a modified digital image. In particular, the act 1206 involves generating a modified input digital image from the appearance code and the content code utilizing a neural network decoder, the modified input digital image comprising the appearance of the reference digital image and the content of the input digital image.

As illustrated, the series of acts 1200 also includes an act 1208 of generating a harmonized digital image. In particular, the act 1208 involves generating a harmonized digital image by combining a portion of the modified digital image with the reference digital image. For example, the act 1208 involves utilizing a fitting function learned from low-resolution digital images to combine the portion of the modified digital image with the reference digital image in a high resolution.

In some cases, the act 1208 involves receiving a mask indicating the portion of the modified digital image to combine with the reference digital image. In certain embodiments, the act 1208 involves generating the harmonized digital image in response to receiving indications of user selections of the reference digital image and the input digital image to combine together. In these or other embodiments, the act 1208 involves combining a portion of the modified digital image with the first digital image such that the portion of the modified digital image comprises a foreground of the harmonized digital image and the first digital image comprises a background of the harmonized digital image. In some cases, the act 1208 involves: receiving an indication of user interaction to generate a mask defining the portion of the modified digital image to combine with the first digital image; selecting the portion of the modified digital image indicated by the mask; and combining the portion of the modified digital image with the first digital image utilizing a fitting function to adapt resolutions.

In certain embodiments, the series of acts 1200 includes an act of receiving an indication of user interaction selecting the first digital image and the second digital image to combine together to generate the modified digital image.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
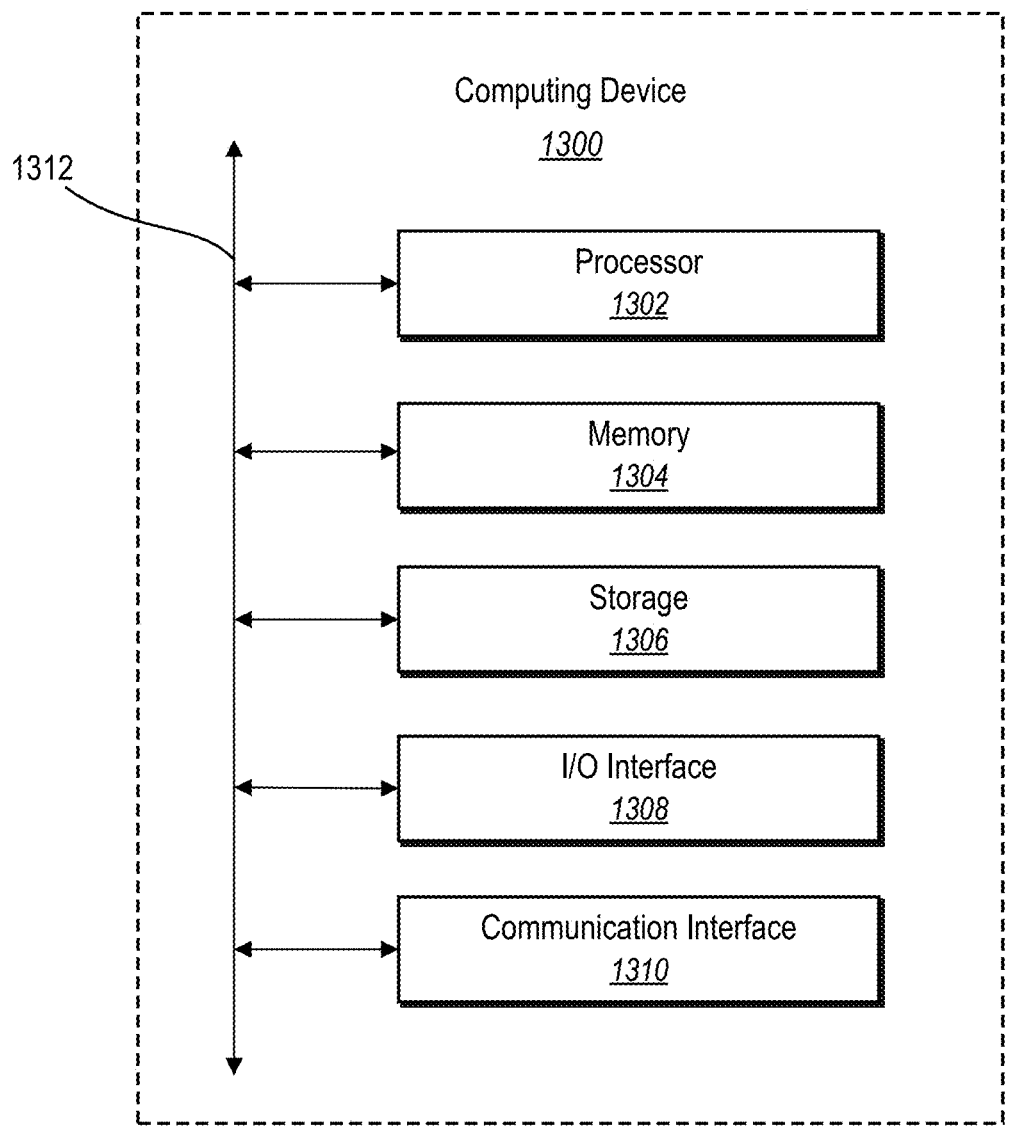
FIG. 13 illustrates a block diagram of an example computing device in accordance with one or more embodiments.

FIG. 13 illustrates, in block diagram form, an example computing device 1300 (e.g., the computing device 1000, the client device 110, and/or the server device(s) 104) that may be configured to perform one or more of the processes described above. One will appreciate that the image harmonization system 102 can comprise implementations of the computing device 1300. As shown by FIG. 13, the computing device can comprise a processor 1302, memory 1304, a storage device 1306, an I/O interface 1308, and a communication interface 1310. Furthermore, the computing device 1300 can include an input device such as a touchscreen, mouse, keyboard, etc. In certain embodiments, the computing device 1300 can include fewer or more components than those shown in FIG. 13. Components of computing device 1300 shown in FIG. 13 will now be described in additional detail.

In particular embodiments, processor(s) 1302 includes hardware for executing instructions, such as those making up a computer program. As an example, and not by way of limitation, to execute instructions, processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, storage device 1306 can comprise a non-transitory storage medium described above. The storage device 1306 may include a hard disk drive (HDD), flash memory, a Universal Serial Bus (USB) drive or a combination of these or other storage devices.

The computing device 1300 also includes one or more input or output ("I/O") devices/interfaces 1308, which are provided to allow a user to provide input to (such as user strokes), receive output from, and otherwise transfer data to and from the computing device 1300. These I/O devices/interfaces 1308 may include a mouse, keypad or a keyboard, a touch screen, camera, optical scanner, network interface, modem, other known I/O devices or a combination of such I/O devices/interfaces 1308. The touch screen may be activated with a writing device or a finger.

The I/O devices/interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1308 is configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 can provide one or more interfaces for communication (such as, for example, packet-based communication) between the computing device and one or more other computing devices 1300 or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can comprise hardware, software, or both that couples components of computing device 1300 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A system comprising:
   one or more memory devices comprising a self-supervised image harmonization neural network comprising:
   a neural network appearance encoder that extracts an appearance code by disentangling appearance features from content features of a first digital image, the appearance code comprising a latent vector representing one or more appearance characteristics of the first digital image, wherein disentangling the appearance features comprises excluding one or more content features of the first digital image from the latent vector as part of extracting the appearance code;
   a neural network content encoder that extracts a content code by disentangling content features from appearance features of a second digital image, the content code comprising a latent vector representing a spatial arrangement of the second digital image, wherein disentangling the content features comprises excluding one or more appearance features of the second digital image from the latent vector as part of extracting the content code; and
   a neural network decoder that generates a modified digital image from the appearance code and the content code.

2. The system of claim 1, further comprising one or more computing devices that are configured to cause the system to extract the appearance code from the first digital image by utilizing the neural network appearance encoder to extract features representing one or more of color, contrast, brightness, or saturation of the first digital image.

3. The system of claim 1, further comprising one or more computing devices that are configured to cause the system to extract the content code from the second digital image by utilizing the neural network content encoder to extract features representing a spatial arrangement defining positions and shapes of objects in the second digital image.

4. The system of claim 1, further comprising one or more computing devices that are configured to cause the system to generate a harmonized digital image by combining a portion of the modified digital image with the first digital image such that the portion of the modified digital image comprises a foreground of the harmonized digital image and the first digital image comprises a background of the harmonized digital image.

5. The system of claim 4, wherein the one or more computing devices are further configured to generate the harmonized digital image by:
   receiving an indication of user interaction to generate a mask defining the portion of the modified digital image to combine with the first digital image;
   selecting the portion of the modified digital image indicated by the mask; and
   combining the portion of the modified digital image with the first digital image utilizing a fitting function to adapt resolutions.

6. The system of claim 1, further comprising one or more computing devices that are configured to cause the system to receive an indication of user interaction selecting the first digital image and the second digital image to combine together to generate the modified digital image.

7. A non-transitory computer readable medium comprising instructions that, when executed by at least one processor, cause a computing device to:
   extract, from a reference digital image, an appearance code by disentangling appearance features from content features of the reference digital image utilizing a neural network appearance encoder, the appearance code comprising a latent vector representing one or more appearance characteristics of the reference digital image, wherein disentangling the appearance features comprises excluding one or more content features of the reference digital image from the latent vector as part of extracting the appearance code;
   extract, from an input digital image, a content code by disentangling content features from appearance features of the input digital image utilizing a neural network content encoder, the content code comprising a latent vector representing a spatial arrangement of the input digital image, wherein disentangling the content features comprises excluding one or more appearance features of the input digital image from the latent vector as part of extracting the content code;
   generate a modified digital image from the appearance code and the content code utilizing a neural network decoder, the modified digital image comprising the one or more appearance characteristics of the reference digital image and the spatial arrangement of the input digital image; and
   generate a harmonized digital image by combining a portion of the modified digital image with the reference digital image.

8. The non-transitory computer readable medium of claim 7, further comprising instructions that, when executed by the at least one processor, cause the computing device to generate the harmonized digital image by utilizing a fitting function learned from low-resolution digital images to combine the portion of the modified digital image with the reference digital image in a high resolution.

9. The non-transitory computer readable medium of claim 7, further comprising instructions that, when executed by the at least one processor, cause the computing device to generate the harmonized digital image by receiving a mask indicating the portion of the modified digital image to combine with the reference digital image.

10. The non-transitory computer readable medium of claim 7, further comprising instructions that, when executed by the at least one processor, cause the computing device to generate the harmonized digital image in response to receiving indications of user selections of the reference digital image and the input digital image to combine together.

11. The non-transitory computer readable medium of claim 7, further comprising instructions that, when executed by the at least one processor, cause the computing device to extract the content code by utilizing the neural network content encoder to extract features representing a spatial arrangement defining positions and shapes of objects in the input digital image.

12. The non-transitory computer readable medium of claim 7, further comprising instructions that, when executed by the at least one processor, cause the computing device to extract the appearance code by utilizing the neural network appearance encoder to extract features representing color of the reference digital image without representing texture.

13. A computer-implemented method comprising:
extracting, utilizing a neural network appearance encoder, an appearance code by disentangling appearance features from content features of a first digital image, the appearance code comprising a latent vector representing one or more appearance characteristics of the first digital image, wherein disentangling the appearance features comprises excluding one or more content features of the first digital image from the latent vector as part of extracting the appearance code;
extracting, utilizing a neural network content encoder, a content code by disentangling content features from appearance features of a second digital image, the content code comprising a latent vector representing a spatial arrangement of the second digital image, wherein disentangling the content features comprises excluding one or more appearance features of the second digital image from the latent vector as part of extracting the content code; and
generating, utilizing a neural network decoder, a modified digital image from the appearance code and the content code.

14. The computer-implemented method of claim 13, further comprising extracting the appearance code from the first digital image by utilizing the neural network appearance encoder to extract features representing one or more of color, contrast, brightness, or saturation of the first digital image.

15. The computer-implemented method of claim 13, further comprising extracting the content code from the second digital image by utilizing the neural network content encoder to extract features representing a spatial arrangement defining positions and shapes of objects in the second digital image.

16. The computer-implemented method of claim 13, further comprising generating a harmonized digital image by combining a portion of the modified digital image with the first digital image such that the portion of the modified digital image comprises a foreground of the harmonized digital image and the first digital image comprises a background of the harmonized digital image.

17. The computer-implemented method of claim 16, further comprising generating the harmonized digital image by:
receiving an indication of user interaction to generate a mask defining the portion of the modified digital image to combine with the first digital image;
selecting the portion of the modified digital image indicated by the mask; and
combining the portion of the modified digital image with the first digital image utilizing a fitting function to adapt resolutions.

18. The computer-implemented method of claim 13, further comprising receiving an indication of user interaction selecting the first digital image and the second digital image to combine together to generate the modified digital image.

19. The computer-implemented method of claim 15, further comprising disentangling the content features from the appearance features of the second digital image by utilizing the neural network content encoder to extract features that represent the spatial arrangement of the second digital image while excluding features representing appearance characteristics of the second digital image.

20. The computer-implemented method of claim 14, further comprising disentangling the appearance features from the content features of the second digital image by utilizing the neural network appearance encoder to extract features that represent appearance characteristics of the first digital image while excluding features representing content characteristics of the first digital image.

* * * * *